US012568477B2

(12) United States Patent
Wang et al.

(10) Patent No.: US 12,568,477 B2
(45) Date of Patent: Mar. 3, 2026

(54) PARAMETER UPDATE METHOD AND RELATED APPARATUS

(71) Applicant: Huawei Technologies Co., Ltd., Shenzhen (CN)

(72) Inventors: Xiaolu Wang, Hangzhou (CN); Hejia Luo, Hangzhou (CN); Jianwei Zhou, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 18/301,050

(22) Filed: Apr. 14, 2023

(65) Prior Publication Data

US 2023/0254830 A1 Aug. 10, 2023

Related U.S. Application Data

(63) Continuation of application No. PCT/CN2021/123498, filed on Oct. 13, 2021.

(30) Foreign Application Priority Data

Oct. 15, 2020 (CN) .......................... 202011114508.6

(51) Int. Cl.
*H04W 72/0446* (2023.01)
*H04W 72/0453* (2023.01)
*H04W 84/06* (2009.01)

(52) U.S. Cl.
CPC .................. *H04W 72/0446* (2013.01); *H04W 72/0453* (2013.01); *H04W 84/06* (2013.01)

(58) Field of Classification Search
CPC ......... H04W 56/0045; H04W 72/0446; H04W 72/0453; H04W 56/0035; H04W 72/21;
(Continued)

(56) References Cited

U.S. PATENT DOCUMENTS

2013/0083791 A1* 4/2013 Jobert ................... H04J 3/0658
370/350
2018/0262313 A1* 9/2018 Nam ...................... H04L 5/0044
(Continued)

OTHER PUBLICATIONS

ZTE Corporation et al: "Consideration on Random Access for NTN", 3GPP Draft; R2-1900576 Consideration on Random Access for NTN, 3rd Generation Partnership Project (3GPP), Mobile Competence Centre; 650. Route Des Lucioles; F-06921 Sophia-Antipolis Cedex; France, vol. RAN WG2, No. Athens, Greece; Feb. 25, 2019-Mar. 1, 2019 Feb. 14, 2019, XP051601956, total 8 pages.
(Continued)

*Primary Examiner* — Brian D Nguyen
(74) *Attorney, Agent, or Firm* — Conley Rose, P.C.

(57) ABSTRACT

A terminal apparatus receives a parameter that is configured by a network apparatus and that is used to calculate an update period, where the update period is used to indicate time at which the terminal apparatus receives an uplink time-frequency synchronization parameter. The terminal apparatus receives an updated uplink time-frequency synchronization parameter based on the update period. The network apparatus configures the parameter for calculating the update period, so that the terminal apparatus can update the uplink time-frequency synchronization parameter in time.

20 Claims, 16 Drawing Sheets

(58) Field of Classification Search
CPC ............... H04W 56/003; H04W 84/06; H04W 24/02; H04B 7/18513
See application file for complete search history.

(56)     References Cited

U.S. PATENT DOCUMENTS

| 2019/0140709 A1* | 5/2019 | Guerra | ................. | H04B 7/0452 |
| 2020/0053670 A1* | 2/2020 | Jung | ................. | H04W 56/0015 |
| 2021/0297961 A1* | 9/2021 | Park | ...................... | H04W 74/08 |
| 2023/0068462 A1* | 3/2023 | Moon | ................. | H04W 56/001 |
| 2023/0156849 A1* | 5/2023 | Xu | ........................ | H04W 76/27 370/328 |
| 2023/0239822 A1* | 7/2023 | Fu | ..................... | H04W 56/0055 370/350 |
| 2024/0224209 A1* | 7/2024 | Lee | ...................... | H04W 76/30 |

OTHER PUBLICATIONS

OPPO: "Discussion on time advance in NTN", 3GPP Draft; R2-1915168, 3rd Generation Partnership Project (3GPP), Mobile Competence Centre; 650, route des Lucioles; F-06921 SophiaAntipolis Cedex; France, vol. RAN WG2, No. Reno, USA; Nov. 18, 2019- Nov. 22, 2019, Nov. 8, 2019, XP051817064, total 3 pages.

* cited by examiner $(x, y, z, v_x, v_y, v_{z,} t)$

Satellite

Service link

Feeder link

Terminal

Ground

Gateway

Satellite

Service link

Feeder link

Terminal

Terminal

Gateway

PARAMETER UPDATE METHOD AND RELATED APPARATUS

CROSS-REFERENCE TO RELATED APPLICATIONS

This is a continuation of International Patent Application No. PCT/CN2021/123498 filed on Oct. 13, 2021, which claims priority to Chinese Patent Application No. 202011114508.6 filed on Oct. 15, 2020. The disclosures of the aforementioned applications are hereby incorporated by reference in their entireties.

TECHNICAL FIELD

This application relates to the field of communication technologies, and in particular, to a parameter update method and a related apparatus.

BACKGROUND

In a non-terrestrial network (NTN) communication scenario, as shown in FIG. 1A, a user terminal receives common timing advance (TA), a common TA rate, a Doppler shift value, and a Doppler shift rate that are related to a feeder link and that are sent by a network apparatus (for example, a base station). The user terminal is referred to as a terminal for short, and the Doppler shift may also be referred to as Doppler for short. The common TA may be common TA of the feeder link, and may be equal to a round-trip latency of the feeder link, or may be equal to a difference between a round-trip latency of the feeder link and timing compensation performed by the network apparatus for receiving uplink data. The common TA rate may be a rate of the common TA changing with time.

A user equipment (UE) receives the common TA, the common TA rate, the Doppler, and the Doppler rate value that are related to the feeder link and that are sent by the network apparatus to the UE, and calculates a round-trip latency and a round-trip latency rate of a service link, Doppler of the service link, and a Doppler rate of the service link based on position information of the terminal and position velocity time (PVT) information of a satellite. The UE may adjust an uplink TA value and an uplink frequency pre-compensation value based on these parameters. For ease of description, in embodiments of this application, the PVT of the satellite, and the common TA, the common TA rate, the Doppler, and the Doppler rate that are related to the feeder link are referred to as uplink time-frequency synchronization parameters.

In the NTN communication scenario, if the terminal cannot update the uplink time-frequency synchronization parameters in time, communication quality is affected. Therefore, a parameter update method is required to ensure communication quality.

SUMMARY

Embodiments of this application provide a parameter update method. The network apparatus configures a parameter for calculating an update period, so that the terminal apparatus can update an uplink time-frequency synchronization parameter in time. This reduces an error of uplink time-frequency synchronization, and ensures communication quality.

According to a first aspect, an embodiment of this application provides a parameter update method. A terminal apparatus receives a parameter that is configured by a network apparatus and that is used to calculate an update period, where the update period is used to indicate time at which the terminal apparatus receives an uplink time-frequency synchronization parameter.

The terminal apparatus receives an updated uplink time-frequency synchronization parameter based on the update period.

When obtaining, through calculation, the uplink time-frequency synchronization parameter and the parameter for calculating the update period, the network apparatus may determine, based on different application scopes, an uplink time-frequency synchronization parameter and a parameter for calculating the update period.

For example, if the uplink time-frequency synchronization parameter and the parameter for calculating the update period are determined based on a cell level, a reference point may be selected within a cell coverage area to obtain, through calculation, the uplink time-frequency synchronization parameter and the parameter for calculating the update period. The reference point may be a reference point on the ground or a reference point at a specific height above the ground.

The uplink time-frequency synchronization parameter and the parameter for calculating the update period are determined based on a beam level. Similarly, a reference point may be selected within a beam coverage area to obtain, through calculation, the uplink time-frequency synchronization parameter and the parameter for calculating the update period.

The uplink time-frequency synchronization parameter and the parameter for calculating the update period are determined based on a terminal apparatus level. The terminal apparatus may report position information of the terminal apparatus to the network apparatus, and then the network apparatus may determine, based on the position information of the terminal apparatus and position orbit information of a satellite, the uplink time-frequency synchronization parameter of the terminal apparatus and the parameter for calculating the update period. After determining the uplink time-frequency synchronization parameter and the parameter for calculating the update period, the network apparatus may configure these parameters for the terminal apparatus.

Optionally, the network apparatus sends, to the terminal apparatus by using a first message, the parameter for calculating the update period. The first message is a system information block (SIB), other system information block (OSI), a master system information block (MIB), Radio Resource Control (RRC), downlink control information (DCI), a media access control (MAC) control element (CE), a TA command (TA command (TAC)), a bandwidth part-downlink common parameter (BWP-DownlinkCommon), and a bandwidth part-uplink common parameter (BWP-UplinkCommon), a bandwidth part-downlink dedicated parameter (BWP-DownlinkDedicated), a bandwidth part-uplink dedicated parameter (BWP-UplinkDedicated), a bandwidth part (BWP), a transmission configuration indicator (TCI), or a synchronization signal block (SSB).

Optionally, the network apparatus may send, to the terminal apparatus along with interaction data, the parameter for calculating the update period.

Optionally, the network apparatus may send, to the terminal apparatus in a separately allocated physical downlink shared channel (PDSCH), the parameter used to calculate the update period.

For different application scenarios, the network apparatus may select different first messages to configure, for the terminal apparatus, the parameter for calculating the update period. Descriptions are separately provided below.

When the terminal apparatus needs to perform beam switching or cell switching, before the switching occurs, the network apparatus delivers, to the terminal apparatus, a parameter that needs to be used by the terminal apparatus in a target cell or a target beam and that is used to calculate an update period. This ensures that the terminal apparatus can use the new update period in a relatively short time after being switched to the target cell or the target beam, so that communication continuity is ensured.

When beam switching or BWP switching occurs on the terminal apparatus, if the terminal apparatus is switched to an initial BWP, the network apparatus sends, to the terminal apparatus in RRC signaling corresponding to the BWP, the parameter for calculating the update period; or if the terminal apparatus is switched to another non-initial BWP, the network apparatus may send, to the terminal apparatus in the BWP-DownlinkCommon or the BWP-UplinkCommon, the parameter for calculating the update period.

A measurement procedure may be triggered before beam switching, BWP switching, or cell switching occurs on the terminal apparatus. Therefore, the network apparatus may deliver, by using neighboring cell measurement configuration information or corresponding RRC signaling in a switching process, the parameter that needs to be used by the terminal apparatus in the target cell or the beam and that is used to calculate the update period, for example, may deliver the parameter by using measurement configuration (MeasConfig) signaling in RRC signaling. In a cell switching procedure, in a BWP (serving BWP) that provides a service, a beam (serving beam) that provides a service, or a cell (serving cell) that provides a service, the parameter for calculating the update period may alternatively be sent to the terminal apparatus by using an RRC reconfiguration (RRC Reconfiguration) message.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality.

With reference to the first aspect, in a possible implementation of the first aspect, the method further includes: the terminal apparatus receives time-frequency resource indication information sent by the network apparatus, where the time-frequency resource indication information indicates one or more time-frequency resources; and the terminal apparatus receives the updated uplink time-frequency synchronization parameter based on the time-frequency resource, where the time-frequency resource is used to transmit the uplink time-frequency synchronization parameter, and the time-frequency resource includes a subframe, a slot, a symbol, and/or a frequency domain resource.

In this embodiment, the network apparatus may send the time-frequency resource indication information to the terminal apparatus in the first message. The network apparatus may alternatively send the time-frequency resource indication information to the terminal apparatus in another message. This is not limited herein.

Optionally, the network apparatus may send the time-frequency resource indication information along with interaction data to the terminal apparatus.

Optionally, the network apparatus may send the time-frequency resource indication information to the terminal apparatus in a separately allocated PDSCH.

In another optional implementation, the terminal apparatus determines, based on preconfigured time-frequency resource indication information, the time-frequency resource used to receive an updated uplink time-frequency synchronization parameter.

The time-frequency resource indication information indicates one or more time-frequency resources, where the time-frequency resource includes a subframe, a slot, a symbol, and/or a frequency domain resource.

In this embodiment of this application, the terminal apparatus may further receive the time-frequency resource indication information sent by the network apparatus. The terminal apparatus determines the time-frequency resource based on the time-frequency resource indication information, and receives the uplink time-frequency synchronization parameter based on the time-frequency resource.

With reference to the first aspect, in a possible implementation of the first aspect, that a terminal apparatus receives a parameter that is configured by a network apparatus and that is used to calculate an update period includes: the terminal apparatus receives a parameter of an update period equation, update start time, and a time interval for calculating the update period that are configured by the network apparatus; and the terminal apparatus obtains the update period through calculation based on the update period equation, the parameter of the update period equation, the update start time, and the time interval for calculating the update period.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. The network apparatus needs to configure, for only once, the parameter for calculating the update period, so that signaling overheads are reduced. An update curve equation configured in the terminal apparatus is highly fit with a time curve of an actual update period. Therefore, an update period obtained by using the update curve equation is closer to the actual update period, to ensure communication quality of the terminal apparatus.

With reference to the first aspect, in a possible implementation of the first aspect, the update period equation is:

$$y = a \times t^2 + b \times t + c, \text{ where } t = T + n \times \Delta T.$$

a, b, and c are parameters of the update period equation, T is the update start time, $\Delta T$ is the time interval for calculating the update period, n is a quantity of times of calculating the update period, y is the update period, a is a real number, b is a real number, and c is a real number.

With reference to the first aspect, in a possible implementation of the first aspect, that a terminal apparatus receives a parameter that is configured by a network apparatus and that is used to calculate an update period includes: the terminal apparatus receives a start value of the update period, an end value of the update period, a time interval for calculating the update period, and an update period interval that are configured by the network apparatus; the terminal apparatus calculates the update period based on the start value of the update period and the update period interval, where the update period is calculated once at an interval of the time interval for calculating the update period; and when the update period interval is greater than 0, and the update period is greater than or equal to the end value of the update period, the terminal apparatus stops calculation; or when the update period interval is less than 0, and the update period is less than or equal to the end value of the update period, the terminal apparatus stops calculation.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios.

With reference to the first aspect, in a possible implementation of the first aspect, that a terminal apparatus receives a parameter that is configured by a network apparatus and that is used to calculate an update period includes: the terminal apparatus receives an initial value of the update period, an update period interval, and an update moment set that are configured by the network apparatus, where the update moment set includes one or more moments, and the update moment set is used to indicate time at which the terminal apparatus calculates the update period; and the terminal apparatus calculates, based on the start value of the update period and the update period interval, the update period at the time indicated by the update moment set.

The terminal apparatus receives, by using the first message, the start value of the update period, the update period interval, and the time interval for calculating the update period that are configured by the network apparatus. In this embodiment, for ease of description, the start value of the update period is referred to as "Period 1", the end value of the update period is referred to as "Period 2", the update period interval is referred to as "Δperiod", and the time interval for calculating the update period is referred to as "ΔT".

First, the update period is calculated once at an interval of ΔT. For example, ΔT=60 seconds. After 60 seconds, the terminal apparatus obtains, based on the start value Period 1 of the update period and the update period interval Δperiod, an update period obtained through first calculation, where the update period obtained through the first calculation=Period 1+Δperiod. The update period is calculated once at the interval of ΔT. After 120 seconds (2×ΔT), the terminal apparatus obtains, based on the update period (Period 1+Δperiod) obtained through the first calculation and Δperiod, an update period obtained through second calculation, where the update period obtained through the second calculation=Period 1+2×Δperiod. By analogy, a newly calculated update period "Period_new"=the start value "Period 1" of the update period+n×ΔPeriod, where n is a quantity of times of calculating the update period.

Second, the terminal apparatus receives an updated uplink time-frequency synchronization parameter based on the start value Period 1 of the update period. Third, the terminal apparatus receives an updated uplink time-frequency synchronization parameter based on an update period obtained through each calculation.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. In this solution, the time interval for calculating the update period is not limited, and the time for calculating the update period may be flexibly specified, so that implementation flexibility is improved.

With reference to the first aspect, in a possible implementation of the first aspect, that a terminal apparatus receives a parameter that is configured by a network apparatus and that is used to calculate an update period includes: the terminal apparatus receives an end value of the update period, a time interval for calculating the update period, and an update period interval that are configured by the network apparatus; the terminal apparatus determines, based on the update period used by the terminal apparatus, a start value of the update period; the terminal apparatus calculates the update period based on the start value of the update period and the update period interval, where the update period is calculated once at an interval of the time interval for calculating the update period; and when the update period interval is greater than 0, and the update period is greater than or equal to the end value of the update period, the terminal apparatus stops calculation; or when the update period interval is less than 0, and the update period is less than or equal to the end value of the update period, the terminal apparatus stops calculation.

The terminal apparatus receives, by using the first message, the start value of the update period Period 1, the update period interval Δperiod, and the time interval ΔT for calculating the update period that are configured by the network apparatus. The terminal apparatus receives an update instruction from the network apparatus by using another message, where the update instruction may be carried in any type of message shown in the first message.

First, the update period is calculated once at an interval of ΔT. For example, ΔT=60 seconds. After 60 seconds, the terminal apparatus obtains, based on the start value Period 1 of the update period and the update period interval Δperiod, an update period obtained through first calculation, where the update period obtained through the first calculation=Period 1+Δperiod. The update period is calculated once at the interval of ΔT. After 120 seconds (2×ΔT), the terminal apparatus obtains, based on the update period (Period 1+Δperiod) obtained through the first calculation and Δperiod, an update period obtained through second calculation, where the update period obtained through the second calculation=Period 1+2×Δperiod. By analogy, a newly calculated update period "Period_new"=the start value "Period 1" of the update period+n×ΔPeriod, where n is a quantity of times of calculating the update period.

In an optional implementation, the terminal apparatus starts to calculate the update period or stops calculating the update period based on the update instruction. When a bit that is in the update instruction and that is used to indicate the terminal apparatus to calculate the update period is "1", the terminal apparatus calculates (or starts to calculate) the update period based on the update instruction; or when a bit that is in the update instruction and that is used to indicate the terminal apparatus to calculate the update period is "0", the terminal apparatus stops calculating the update period based on the update instruction.

In another optional implementation, the terminal apparatus continuously calculates the update period based on the parameter for calculating the update period. However, the terminal apparatus uses, based on an indication of the update instruction, the update period obtained through calculation. When a bit that is in the update instruction and that is used to indicate the terminal apparatus to use the update period is "1", the terminal apparatus uses, based on the update instruction, the update period obtained through calculation; or when a bit that is in the update instruction and that is used to indicate the terminal apparatus to use the update period is "0", the terminal apparatus reuses, based on the update instruction, the update period obtained through previous calculation (or an update period pre-configured in the terminal apparatus).

Optionally, when the calculated update period is less than or equal to the end value of the update period, calculation is stopped.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. Because the end value of the update period can be flexibly set, implementation flexibility of the solution is improved.

With reference to the first aspect, in a possible implementation of the first aspect, that a terminal apparatus receives a parameter that is configured by a network apparatus and that is used to calculate an update period includes: the terminal apparatus receives end time for calculating the update period, a time interval for calculating the update period, and an update period interval that are configured by the network apparatus; the terminal apparatus determines, based on the update period used by the terminal apparatus, a start value of the update period; the terminal apparatus calculates the update period based on the start value of the update period and the update period interval, where the update period is calculated once at an interval of the time interval for calculating the update period; and when time for calculating the update period is greater than or equal to the end time for calculating the update period, the terminal apparatus stops calculation.

The terminal apparatus calculates the update period based on the start value Period 1 of the update period, the update period interval Δperiod, the time interval ΔT for calculating the update period, and the end time T_boundary for calculating the update period. Details are as follows:

The terminal apparatus updates the update period once at an interval of ΔT, that is, a newly calculated update period "Period_new"=the start value "Period 1" of the update period+the update period interval Δperiod.

By analogy, until time reaches the end time T_boundary for calculating the update period, the terminal apparatus stops calculating the update period. The T_boundary may be absolute time, for example, Coordinated Universal Time (UTC), or may be a relative time length. For example, T_boundary=1 minute, indicating that a time length for the terminal device to continuously calculate the update period by using the received parameters is 1 minute, and the terminal apparatus stops calculating the update period after 1 minute.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. Because the end time for calculating the update period can be flexibly set, implementation flexibility of the solution is improved.

With reference to the first aspect, in a possible implementation of the first aspect, that a terminal apparatus receives a parameter that is configured by a network apparatus and that is used to calculate an update period includes: the terminal apparatus receives a quantity of times of calculating the update period, a time interval for calculating the update period, and an update period interval that are configured by the network apparatus; the terminal apparatus determines, based on the update period used by the terminal apparatus, a start value of the update period; the terminal apparatus calculates the update period based on the start value of the update period and the update period interval, where the update period is calculated once at an interval of the time interval for calculating the update period; and when a quantity of times that the terminal apparatus calculates the update period is equal to the quantity of times that is of calculating the update period and that is configured by the network apparatus, the terminal apparatus stops calculation.

The parameter that is configured by the network apparatus and that is used to calculate the update period is: the quantity of times of calculating the update period, the time interval for calculating the update period, and the update period interval.

The terminal apparatus calculates the update period based on the start value Period 1 of the update period, the update period interval Δperiod, the time interval ΔT for calculating the update period, and the quantity N_boundary of times of calculating the update period. Details are as follows:

The terminal apparatus updates the update period once at an interval of ΔT, that is, a newly calculated update period "Period_new"=the start value "Period 1" of the update period+n×the update period interval Δperiod, where n is the quantity of times of calculating the update period.

By analogy, until the quantity of times of calculating the update period reaches the quantity N_boundary of times of calculating the update period that is configured by the network apparatus, the terminal apparatus stops calculating the update period. The quantity N_boundary of times of calculating the update period is a nonnegative integer.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. Because the quantity of times of calculating the update period can be flexibly set, implementation flexibility of the solution is improved.

With reference to the first aspect, in a possible implementation of the first aspect, the uplink time-frequency synchronization parameter includes one or more pieces of the following information: PVT information of a satellite, common TA, a common TA rate, a Doppler shift, or a Doppler shift rate. In the PVT information of the satellite, time may be explicitly indicated, or may be implicitly indicated. This is not limited herein.

According to a second aspect, an embodiment of this application provides a parameter update method, including: a network apparatus sends a parameter for calculating an update period to a terminal apparatus, where the update period is used to indicate time at which the terminal apparatus receives an uplink time-frequency synchronization parameter; and the network apparatus sends an updated uplink time-frequency synchronization parameter to the terminal apparatus.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality.

With reference to the second aspect, in a possible implementation of the second aspect, the network apparatus configures a time-frequency resource set for the terminal apparatus, where a time-frequency resource in the time-frequency resource set is used to transmit the uplink time-frequency synchronization parameter, and the time-frequency resource includes a subframe, a slot, a symbol, and/or a frequency domain resource.

In this embodiment of this application, the network apparatus may further send time-frequency resource indication information to the terminal apparatus. The terminal apparatus determines the time-frequency resource based on the time-frequency resource indication information, and receives the uplink time-frequency synchronization parameter based on the time-frequency resource.

With reference to the second aspect, in a possible implementation of the second aspect, the parameter includes: a parameter of an update period equation, update start time, and a time interval for calculating the update period.

In this embodiment of this application, the network apparatus needs to configure, for only once, the parameter for calculating the update period, so that signaling overheads are reduced.

With reference to the second aspect, in a possible implementation of the second aspect, the parameter includes: a start value of the update period, an end value of the update period, a time interval for calculating the update period, and an update period interval. In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios.

With reference to the second aspect, in a possible implementation of the second aspect, the parameter includes: a start value of the update period, a time interval for calculating the update period, an update period interval, and an update instruction.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. The terminal apparatus is indicated by using the update instruction, so that implementation flexibility of the solution is improved.

With reference to the second aspect, in a possible implementation of the second aspect, the parameter includes: an initial value of the update period, an update period interval, and an update moment set, where the update moment set includes one or more moments, and the update moment set is used to indicate time at which the terminal apparatus calculates the update period.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. In this solution, the time interval for calculating the update period is not limited, and the time for calculating the update period may be flexibly specified, so that implementation flexibility is improved.

With reference to the second aspect, in a possible implementation of the second aspect, the parameter includes: an end value of the update period, a time interval for calculating the update period, and an update period interval.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. Because the end value of the update period can be flexibly set, implementation flexibility of the solution is improved.

With reference to the second aspect, in a possible implementation of the second aspect, the parameter includes: an end value of the update period, a quantity of times of calculating the update period, a time interval for calculating the update period, and an update period interval.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. Because the quantity of times of calculating the update period can be flexibly set, implementation flexibility of the solution is improved.

With reference to the second aspect, in a possible implementation of the second aspect, the parameter includes: an end value of the update period, end time for calculating the update period, a time interval for calculating the update period, and an update period interval.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. Because the end time for calculating the update period can be flexibly set, implementation flexibility of the solution is improved.

With reference to the second aspect, in a possible implementation of the second aspect, that a network apparatus sends a parameter for calculating an update period to a terminal apparatus includes: the network apparatus sends a first message to the terminal apparatus, where the first message carries the parameter.

The first message is an SIB, other system information OSI, an MIB, RRC, DCI, a MAC CE, a TA command TAC, a BWP-DownlinkCommon, a BWP-UplinkCommon, a BWP-DownlinkDedicated, a BWP-UplinkDedicated, a BWP, a TCI, or an SSB.

According to a third aspect, an embodiment of this application provides a parameter update method, including: a terminal apparatus receives a second message sent by a network apparatus, where the second message includes time-frequency resource indication information and an update period, the time-frequency resource indication information indicates one or more time-frequency resources, the update period is used to indicate time at which the terminal apparatus receives an uplink time-frequency synchronization parameter, and the time-frequency resource is used to transmit the uplink time-frequency synchronization parameter; and the terminal apparatus receives, based on the update period and the time-frequency resource, the uplink time-frequency synchronization parameter sent by the network apparatus.

In an optional implementation, the terminal apparatus receives the second message sent by the network apparatus, where the second message includes the time-frequency resource indication information and the update period. The terminal apparatus receives one or more second messages sent by the network apparatus. Each time after receiving the second message, the terminal apparatus determines, based on the time-frequency resource indication information and the update period that are included in the second message, the time-frequency resource and the update period that need to be used to receive the uplink time-frequency synchronization parameter sent by the network apparatus. For example, when the time-frequency resource included in the second message is a first subframe, and the update period is 4 seconds, the terminal apparatus receives, by using the first subframe and the update period of 4 seconds, the uplink time-frequency synchronization parameter sent by the network apparatus.

In another optional implementation, the second message includes indication information of a plurality of time-frequency resources and a plurality of update periods, and the second message further includes an index number. The index number is associated with one of the update periods and one of the time-frequency resources.

Optionally, the network apparatus configures, for the terminal apparatus by using another message, the update period or the parameter for calculating the update period, for example, by using DCI signaling. A reserved bit in the DCI signaling is used to transmit the update period or the parameter for calculating the update period.

In this embodiment of this application, the network apparatus sends the second message, where the second message includes the time-frequency resource indication information and the update period, so that the terminal apparatus can update the uplink time-frequency synchronization parameter in time. This reduces an error of uplink time-frequency synchronization, and ensures communication quality. In this solution, the terminal apparatus does not need to calculate the update period, so that calculation complexity of the terminal apparatus is reduced, and power consumption of the terminal apparatus is reduced.

With reference to the third aspect, in a possible implementation of the third aspect, the terminal apparatus receives an index number sent by the network apparatus, where the index number is associated with one of the update periods and one of the time-frequency resources.

The terminal apparatus determines the update period and the time-frequency resource based on the second message and the index number.

After the network apparatus configures an index list for the terminal apparatus, the network apparatus sends an index number to the terminal apparatus, to indicate an update period and a time-frequency resource that are used by the terminal apparatus to receive the uplink time-frequency synchronization parameter, or indicate a group of parameters for calculating the update period and time-frequency resources that are used by the terminal apparatus to receive the uplink time-frequency synchronization parameter.

For example, the network apparatus sends the index number to the terminal apparatus by using DCI signaling. The index number may be transmitted by using a reserved bit in the DCI signaling, or may be transmitted by using another bit in the DCI signaling. This is not limited herein.

In this embodiment of this application, the update period and the time-frequency resource are determined by using the index number from the network apparatus, and the terminal apparatus receives the uplink time-frequency synchronization parameter by using the update period and the time-frequency resource. This improves implementation flexibility of the solution.

According to a fourth aspect, an embodiment of this application provides a parameter update method, including: a network apparatus sends a second message to a terminal apparatus, where the second message includes time-frequency resource indication information and an update period, the time-frequency resource indication information indicates one or more time-frequency resources, the update period is used to indicate time at which the terminal apparatus receives an uplink time-frequency synchronization parameter, and the time-frequency resource is used to transmit the uplink time-frequency synchronization parameter; and the network apparatus sends an updated uplink time-frequency synchronization parameter to the terminal apparatus.

In this embodiment of this application, the network apparatus sends the second message, where the second message includes the time-frequency resource indication information and the update period, so that the terminal apparatus can update the uplink time-frequency synchronization parameter in time. This reduces an error of uplink time-frequency synchronization, and ensures communication quality. In this solution, the terminal apparatus does not need to calculate the update period, so that calculation complexity of the terminal apparatus is reduced, and power consumption of the terminal apparatus is reduced.

With reference to the fourth aspect, in a possible implementation of the fourth aspect, the network apparatus sends an index number to the terminal apparatus, where the index number is associated with one of the update periods and one of the time-frequency resources.

In this embodiment of this application, the update period and the time-frequency resource are determined by using the index number from the network apparatus, and the terminal apparatus receives the uplink time-frequency synchronization parameter by using the update period and the time-frequency resource. This improves implementation flexibility of the solution.

According to a fifth aspect, an embodiment of this application provides a terminal apparatus, including: a transceiver module, configured to receive a parameter that is configured by a network apparatus and that is used to calculate an update period, where the update period is used to indicate time at which the terminal apparatus receives an uplink time-frequency synchronization parameter.

The transceiver module is further configured to receive an updated uplink time-frequency synchronization parameter based on the update period.

In some optional embodiments of this application, the transceiver module is further configured to receive time-frequency resource indication information sent by the network apparatus, where the time-frequency resource indication information indicates one or more time-frequency resources.

The transceiver module is further configured to receive the updated uplink time-frequency synchronization parameter based on the time-frequency resource, where the time-frequency resource is used to transmit the uplink time-frequency synchronization parameter, and the time-frequency resource includes a subframe, a slot, a symbol, and/or a frequency domain resource.

In some optional embodiments of this application, the transceiver module is configured to receive a parameter of an update period equation, update start time, and a time interval for calculating the update period that are configured by the network apparatus.

A processing module is configured to obtain the update period through calculation based on the update period equation, the parameter of the update period equation, the update start time, and the time interval for calculating the update period.

In some optional embodiments of this application, the update period equation is:

$$y=a \times t^2 + b \times t + c, \text{ where } t=T+n \times \Delta T.$$

a, b, and c are parameters of the update period equation, T is the update start time, $\Delta T$ is the time interval for calculating the update period, n is a quantity of times of calculating the update period, and y is the update period.

In some optional embodiments of this application, the transceiver module is configured to receive a start value of the update period, an end value of the update period, a time interval for calculating the update period, and an update period interval that are configured by the network apparatus.

A processing module is configured to calculate the update period based on the start value of the update period and the update period interval, where the update period is calculated once at an interval of the time interval for calculating the update period.

The processing module is configured to: when the update period is greater than or equal to the end value of the update period, stop calculation.

In some optional embodiments of this application, the transceiver module is configured to receive an initial value of the update period, an update period interval, and an update moment set that are configured by the network apparatus, where the update moment set includes one or more moments, and the update moment set is used to indicate time at which the terminal apparatus calculates the update period.

A processing module is configured to calculate, based on the start value of the update period and the update period interval, the update period at the time indicated by the update moment set.

In some optional embodiments of this application, the transceiver module is configured to receive an end value of the update period, a time interval for calculating the update period, and an update period interval that are configured by the network apparatus.

A processing module is configured to determine a start value of the update period based on the update period used by the terminal apparatus.

The processing module is configured to calculate the update period based on the start value of the update period and the update period interval, where the update period is calculated once at an interval of the time interval for calculating the update period.

The processing module is configured to: when the update period is greater than or equal to the end value of the update period, stop calculation.

In some optional embodiments of this application, the transceiver module is configured to receive a first message sent by the network apparatus, where the first message carries the parameter.

The first message is an SIB, OSI, an MIB, RRC, DCI, a MAC CE, a TA command TAC, a BWP-DownlinkCommon, a BWP-UplinkCommon, a BWP-DownlinkDedicated, a BWP-UplinkDedicated, a BWP, a TCI, or an SSB.

In some optional embodiments of this application, the uplink time-frequency synchronization parameter includes one or more pieces of the following information: PVT information of a satellite, common TA, a common TA rate, a Doppler shift, or a Doppler shift rate.

According to a sixth aspect, an embodiment of this application provides a network apparatus, including: a transceiver module, configured to send a parameter for calculating an update period to a terminal apparatus, where the update period is used to indicate time at which the terminal apparatus receives an uplink time-frequency synchronization parameter.

The transceiver module is further configured to send an updated uplink time-frequency synchronization parameter to the terminal apparatus.

In some optional embodiments of this application, the transceiver module is further configured to configure a time-frequency resource set for the terminal apparatus, where a time-frequency resource in the time-frequency resource set is used to transmit the uplink time-frequency synchronization parameter, and the time-frequency resource includes a subframe, a slot, a symbol, and/or a frequency domain resource.

In some optional embodiments of this application, the parameter includes: a parameter of an update period equation, update start time, and a time interval for calculating the update period.

In some optional embodiments of this application, the parameter includes: a start value of the update period, an end value of the update period, a time interval for calculating the update period, and an update period interval.

In some optional embodiments of this application, the parameter includes: an initial value of the update period, an update period interval, and an update moment set, where the update moment set includes one or more moments, and the update moment set is used to indicate time at which the terminal apparatus calculates the update period.

In some optional embodiments of this application, the parameter includes: an end value of the update period, a time interval for calculating the update period, and an update period interval.

In some optional embodiments of this application, the transceiver module is further configured to send a first message to the terminal apparatus, where the first message carries the parameter.

The first message is an SIB, other system information OSI, an MIB, RRC, DCI, a MAC CE, a TA command TAC, a BWP-DownlinkCommon, a BWP-UplinkCommon, a BWP-DownlinkDedicated, a BWP-UplinkDedicated, a BWP, a TCI, or an SSB.

According to a seventh aspect, an embodiment of this application provides a terminal apparatus, including: a transceiver module, configured to receive a second message sent by a network apparatus, where the second message includes time-frequency resource indication information and an update period, the time-frequency resource indication information indicates one or more time-frequency resources, the update period is used to indicate time at which the terminal apparatus receives an uplink time-frequency synchronization parameter, and the time-frequency resource is used to transmit the uplink time-frequency synchronization parameter.

The transceiver module is further configured to receive, based on the update period and the time-frequency resource, the uplink time-frequency synchronization parameter sent by the network apparatus.

In some optional embodiments of this application, the transceiver module is further configured to: receive an index number sent by the network apparatus, where the index number is associated with one of the update periods and one of the time-frequency resources; and the terminal apparatus determines the update period and the time-frequency resource based on the second message and the index number.

According to an eighth aspect, an embodiment of this application provides a network apparatus, including: a transceiver module, configured to send a second message to a terminal apparatus, where the second message includes time-frequency resource indication information and an update period, the time-frequency resource indication information indicates one or more time-frequency resources, the update period is used to indicate time at which the terminal apparatus receives an uplink time-frequency synchronization parameter, and the time-frequency resource is used to transmit the uplink time-frequency synchronization parameter.

The transceiver module is further configured to send an updated uplink time-frequency synchronization parameter to the terminal apparatus.

In some optional embodiments of this application, the transceiver module is further configured to send an index number to the terminal apparatus, where the index number is associated with one of the update periods and one of the time-frequency resources.

According to a ninth aspect, an embodiment of this application provides a communication apparatus. The communication apparatus may implement a function performed by the terminal apparatus or the network apparatus in the method according to the first aspect, the second aspect, the third aspect, or the fourth aspect. The communication apparatus includes a processor, a memory, a receiver connected to the processor, and a transmitter connected to the processor. The memory is configured to store program code, and transmit the program code to the processor. The processor is configured to drive, based on instructions in the program code, the receiver and the transmitter to perform the method according to the first aspect, the second aspect, the third aspect, or the fourth aspect. The receiver and the transmitter are separately connected to the processor, to perform an operation of the terminal apparatus or the network apparatus in the methods according to the foregoing aspects. The transmitter may perform a sending operation, and the receiver may perform a receiving operation. Optionally, the receiver and the transmitter may be a radio frequency circuit, and the radio frequency circuit receives and sends a message through an antenna. Alternatively, the receiver and the transmitter may be a communication interface. The processor is connected to the communication interface by using a bus, and the processor receives or sends a message through the communication interface.

According to a tenth aspect, an embodiment of this application provides a communication apparatus. The communication apparatus may include an entity such as a network apparatus or a chip. The communication apparatus includes a processor and a memory. The memory is configured to store instructions. The processor is configured to execute the instructions in the memory, so that the communication apparatus is enabled to perform the method according to any one of the first aspect, the second aspect, the third aspect, or the fourth aspect.

According to an eleventh aspect, an embodiment of this application provides a computer-readable storage medium storing one or more computer-executable instructions. When the computer-executable instructions are executed by a processor, the processor performs the method according to any one of the possible implementations of the first aspect, the second aspect, the third aspect, or the fourth aspect.

According to a twelfth aspect, an embodiment of this application provides a computer program product (or referred to as a computer program) storing one or more computer-executable instructions. When the computer-executable instructions are executed by a processor, the processor performs the method according to any one of the possible implementations of the first aspect, the second aspect, the third aspect, or the fourth aspect.

According to a thirteenth aspect, this application provides a chip system. The chip system includes a processor, configured to support a computer device in implementing functions in the foregoing aspects. In a possible design, the chip system further includes a memory. The memory is configured to store program instructions and data that are necessary for the computer device. The chip system may include a chip, or may include a chip and another discrete component.

According to a fourteenth aspect, this application provides a communication system. The communication system includes the terminal apparatus or the network apparatus according to the fifth aspect, the sixth aspect, the seventh aspect, or the eighth aspect.

DESCRIPTION OF EMBODIMENTS

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following clearly describes the technical solutions in embodiments of this application with reference to the accompanying drawings in embodiments of this application. In descriptions of this application, "I" means "or" unless otherwise specified. For example, AB may represent A or B. In this application, "and/or" describes only an association relationship for describing associated objects and represents that three relationships may exist. For example, A and/or B may represent the following three cases: only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one of a, b, or c may indicate a, b, c, a and b, a and c, b and c, or a, b, and c, where a, b, and c may be singular or plural.

The technical solutions of this application may be applied to an NTN) system such as a satellite communication system or a high-altitude platform station (HAPS) communication system. The satellite communication system may be integrated with a mobile communication system.

Figure 1A:
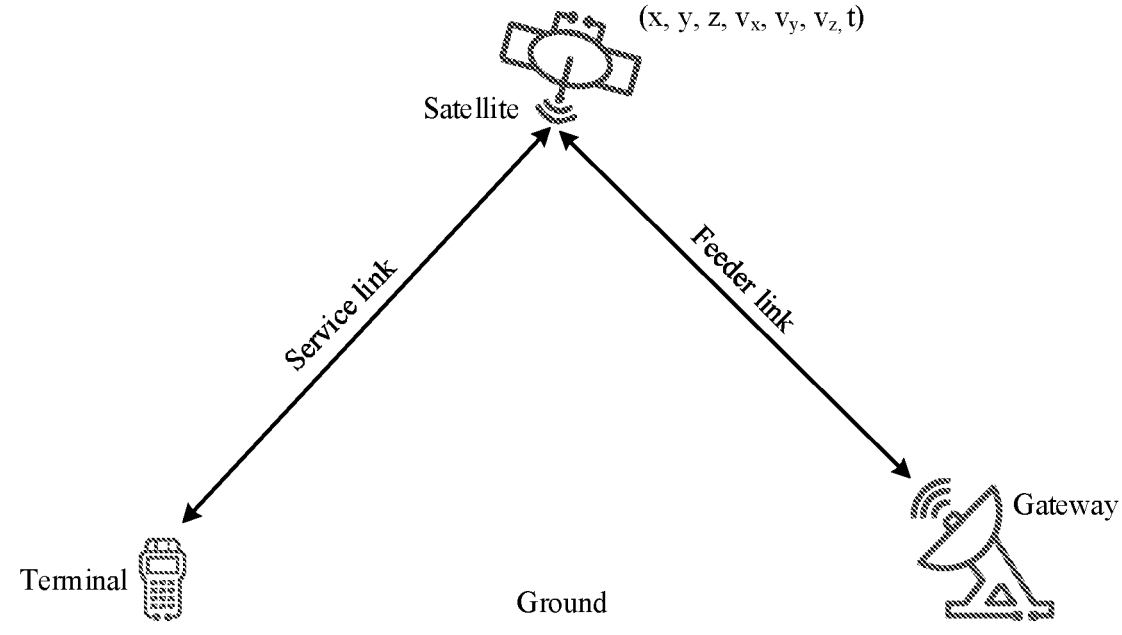
FIG. 1A is a schematic diagram of an application scenario according to an embodiment of this application.
Figure 1B:
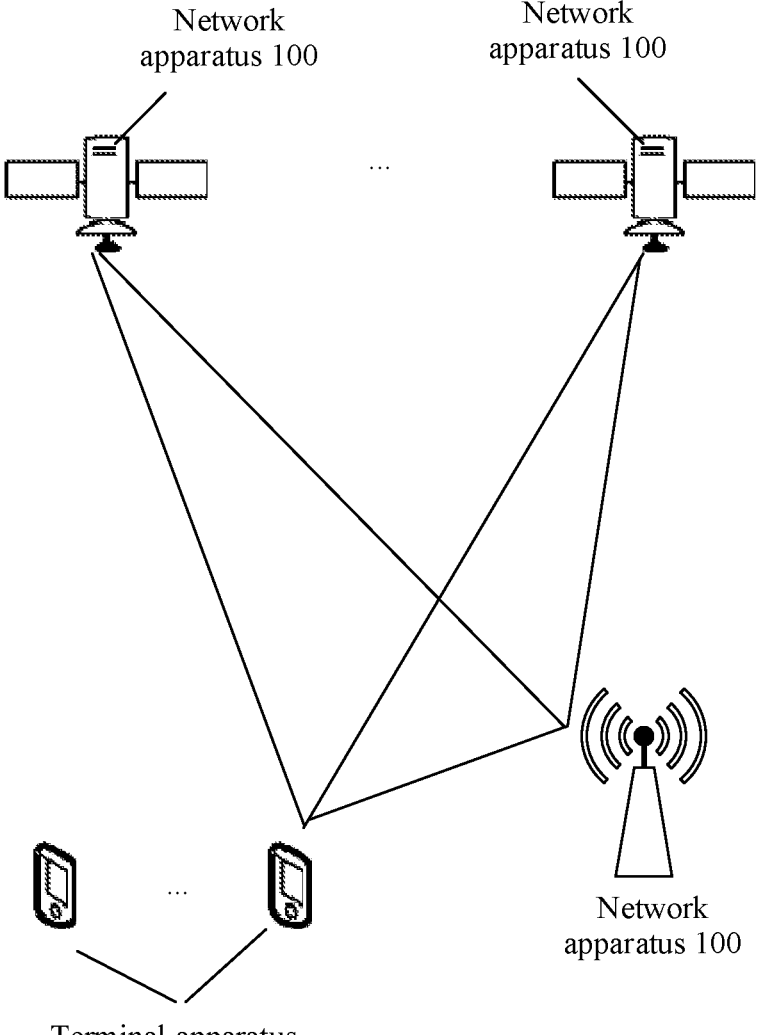
FIG. 1B is a schematic diagram of a communication system according to an embodiment of this application.

FIG. 1B is a schematic diagram of a communication system according to an embodiment of this application. The communication system includes network apparatuses 100 and terminal apparatuses. In a specific implementation process of this embodiment of this application, the terminal apparatus may be a device such as a computer, a smartphone, a telephone set, a cable television set-top box, a digital subscriber line router, an aircraft, a ship, a vehicle, or a high-altitude balloon. The network apparatus 100 may be one of a ground base station, a high-altitude base station, a low earth orbit satellite, a medium earth orbit satellite, or a high-earth orbit satellite. It should be noted that, in actual application, there may be one or more network apparatuses and terminal apparatuses. For example, as shown in FIG. 1B, the network apparatuses 100 include two satellites and one ground base station. In addition, in the communication system shown in FIG. 1B, a quantity of network apparatuses and a quantity of terminal apparatuses are merely adaptive examples. This is not limited in this application.

The communication system may be configured to support a fourth generation (4G) access technology, for example, a Long-Term Evolution (LTE) access technology. Alternatively, the communication system may support a fifth generation (5G) access technology, for example, a new radio (NR) access technology. The communication system may also be applicable to a narrowband-Internet of things (NB-IoT) system and a future-oriented communication technology.

The network apparatus 100 may be configured to support access of the terminal apparatus, for example, may be a terrestrial device such as an evolved NodeB (eNB) in a communication system based on the 4G access technology, a next generation NodeB (gNB) in a communication system based on the 5G access technology, a transmission reception point (TRP), a relay node, or an access point (AP); or may be a non-terrestrial device: a high-altitude base station, for example, a device such as a hot air balloon that can provide a wireless access function for the terminal apparatus, a low earth orbit satellite, a medium earth orbit satellite, or a high-earth orbit satellite; or may be a mobile switching center and a device that undertakes a base station function in device-to-device (D2D) communication, vehicle-to-everything (V2X) communication, or machine-to-machine (M2M) communication, or the like.

The terminal apparatus in FIG. 1B may be a device that provides voice or data connectivity for a user. The terminal apparatus is also referred to as UE, or may be referred to as a mobile station, a subscriber unit, a station, a terminal equipment (TE), or the like. The terminal apparatus may be a cellular phone, a personal digital assistant (PDA), a wireless modem, a handheld device, a laptop computer, a cordless phone, a wireless local loop (WLL) station, a tablet computer (pad), or the like. With development of wireless communication technologies, a device that can access a communication system, a device that can communicate with a network side in a communication system, or a device that can communicate with another object by using a communication system may be the terminal apparatus in this embodiment of this application, for example, a terminal apparatus and a vehicle in intelligent transportation, a household device in smart home, an electricity meter reading instrument in smart grid, a voltage monitoring instrument, an environment monitoring instrument, a video surveillance instrument in an intelligent security network, or a cashing machine. In this embodiment of this application, the terminal apparatus may communicate with a base station, for example, the network apparatuses 100 in FIG. 1B. A plurality of terminal apparatuses may also communicate with each other. The terminal apparatus may be statically fixed or mobile.

Figure 1C:
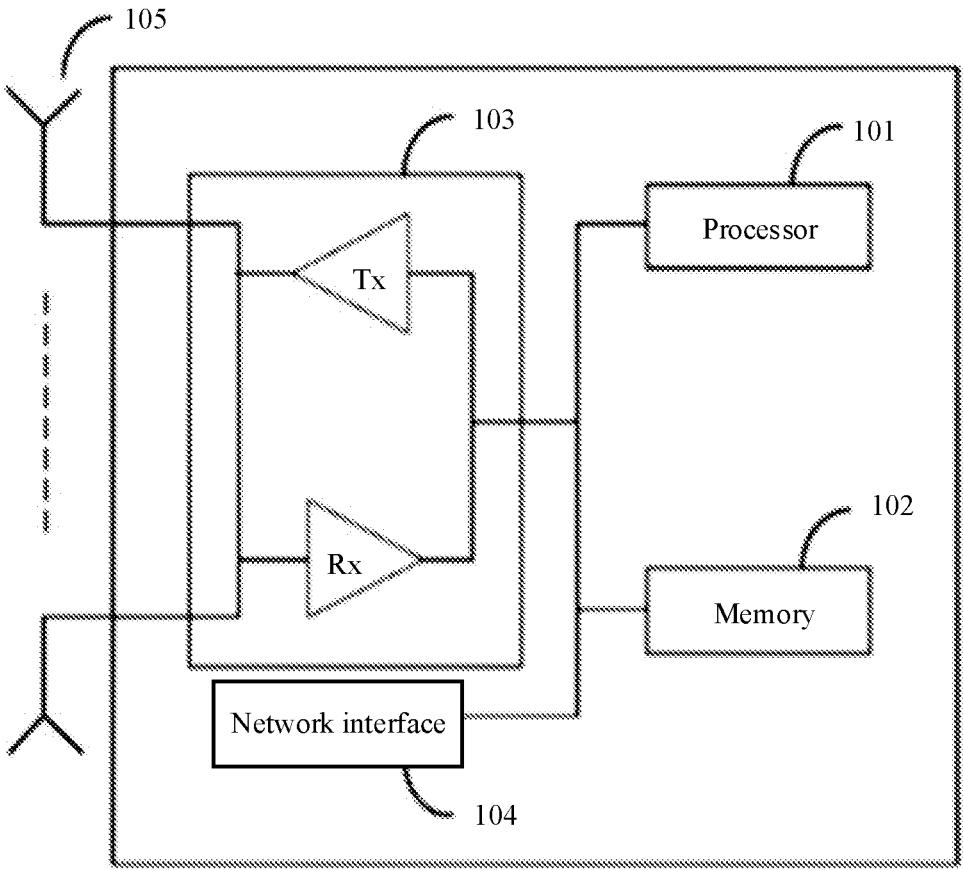
FIG. 1C is a schematic diagram of a structure of a network apparatus.

FIG. 1C is a schematic diagram of a structure of a network apparatus. In FIG. 1C, the network apparatus includes at least one processor 101 and a transceiver 103, and may further include at least one memory 102, at least one network interface 104, and one or more antennas 105. The processor 101, the memory 102, the transceiver 103, and the network interface 104 are connected, for example, are connected by using a bus. The antenna 105 is connected to the transceiver 103. The network interface 104 is configured to enable the base station to be connected to another communication device through a communication link. In this embodiment of this application, the connection may include various types of interfaces, transmission lines, buses, or the like. This is not limited in this embodiment.

The processor in this embodiment of this application, for example, the processor 101, may include at least one of the following types: a general-purpose central processing unit (CPU), a digital signal processor (DSP), a microprocessor, an application-specific integrated circuit (ASIC), a microcontroller unit (MCU), a field-programmable gate array (FPGA), or an integrated circuit configured to implement a logical operation. For example, the processor 101 may be a single-core (single-CPU) processor or a multi-core (multi-CPU) processor. The at least one processor 101 may be integrated into one chip or located on a plurality of different chips.

The memory in this embodiment of this application, for example, the memory 102, may include at least one of the following types: a read-only memory (ROM), another type of static storage device that can store static information and instructions, a random-access memory (RAM), another type of dynamic storage device that can store information and instructions, or an electrically erasable programmable-only memory (EEPROM). In some scenarios, the memory may alternatively be a compact disc read-only memory (CD-ROM), another compact disc storage, an optical disc storage (including a compressed optical disc, a laser disc, an optical disc, a digital versatile disc (DVD), a BLU-RAY disc), a magnetic disk storage medium, another magnetic storage device, or any other medium that can be used to carry or store expected program code in a form of an instruction or a data structure and that can be accessed by a computer. This is not limited thereto.

The memory 102 may exist independently, and is connected to the processor 101. Optionally, the memory 102 and the processor 101 may alternatively be integrated, for example, integrated into one chip. The memory 102 can store program code for performing the technical solutions in embodiments of this application, and the processor 101 controls execution of the program code. Various types of computer program code to be executed may also be considered as drivers of the processor 101. For example, the processor 101 is configured to execute the computer program code stored in the memory 102, to implement the technical solutions in embodiments of this application.

The transceiver 103 may be configured to support receiving or sending of a radio frequency signal between the network apparatus and the terminal apparatus, and the transceiver 103 may be connected to the antenna 105. The transceiver 103 includes a transmitter Tx and a receiver Rx. The one or more antennas 105 may receive a radio frequency signal. The receiver Rx of the transceiver 103 is configured to: receive the radio frequency signal from the antenna, convert the radio frequency signal into a digital baseband signal or a digital intermediate frequency signal, and provide the digital baseband signal or the digital intermediate frequency signal for the processor 101, so that the processor 101 further processes the digital baseband signal or the digital intermediate frequency signal, for example, performs demodulation processing and decoding processing. In addition, the transmitter Tx of the transceiver 103 is further configured to: receive a modulated digital baseband signal or digital intermediate frequency signal from the processor 101, convert the modulated digital baseband signal or digital intermediate frequency signal into a radio frequency signal, and send the radio frequency signal through the one or more antennas 105. The receiver Rx may selectively perform one or more levels of frequency down-mixing processing and analog-to-digital conversion processing on the radio frequency signal, to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal, to obtain the radio frequency signal. A sequence of the frequency up-mixing processing and the digital-to-analog conversion processing is adjustable. The digital baseband signal and the digital intermediate frequency signal may be collectively referred to as a digital signal.

In an optional implementation, the transceiver 103 is configured to send a signal through the antenna 105. The transceiver 103 is configured to receive the signal through at least one of the antennas 105. Particularly, in the technical solutions provided in embodiments of this application, the transceiver 103 may be configured to perform an operation through at least one of the antennas 105, for example, an operation performed by a transceiver module in a satellite when a parameter update method in a subsequent method embodiment is applied to the satellite.

In this embodiment of this application, the transceiver 103 is configured to support the network apparatus in performing the foregoing receiving function and sending function. A processor having a processing function is considered as the processor 101. The transceiver 103 may also be referred to as a receiver, an input port, an input circuit, a receiving circuit, or the like. The transceiver 103 may be referred to as an output circuit, a transmitter, a transmitter, a transmitting circuit, or the like.

The processor 101 may be configured to execute the instructions stored in the memory 102, to control the transceiver 103 to receive a message and/or send a message, to complete a function of the network apparatus in the method embodiments of this application. In an implementation, it may be considered that a function of the transceiver 103 is implemented by using a transceiver circuit or a dedicated transceiver chip. In this embodiment of this application, that the transceiver 103 receives a message may be understood as that the transceiver 103 inputs a message, and that the transceiver 103 sends a message may be understood as that the transceiver 103 outputs a message.

It should be noted that a specific structure of the terminal apparatus is similar to that of the network apparatus 100. Details are not described herein again. Optionally, the terminal apparatus may further include a positioning module. The positioning module may measure a position of the terminal apparatus by using a satellite positioning system or a terrestrial positioning system. The satellite positioning system in this embodiment of this application includes but is not limited to: a Global Positioning System (GPS), a BeiDou navigation satellite system (BDS), a Global Navigation Satellite System (GLONASS), or a Galileo satellite navigation system.

For example, the terminal apparatus may first obtain position information of the terminal apparatus by using the positioning module. Second, the terminal apparatus may transmit the position information of the terminal apparatus to the network apparatus 100 by using the transceiver. The position information may be longitude and latitude coordinates, for example, north latitude N22° 32' 43.86" and east longitude E114° 03' 10.40". Optionally, the position information may further include altitude information.

Figure 1D:
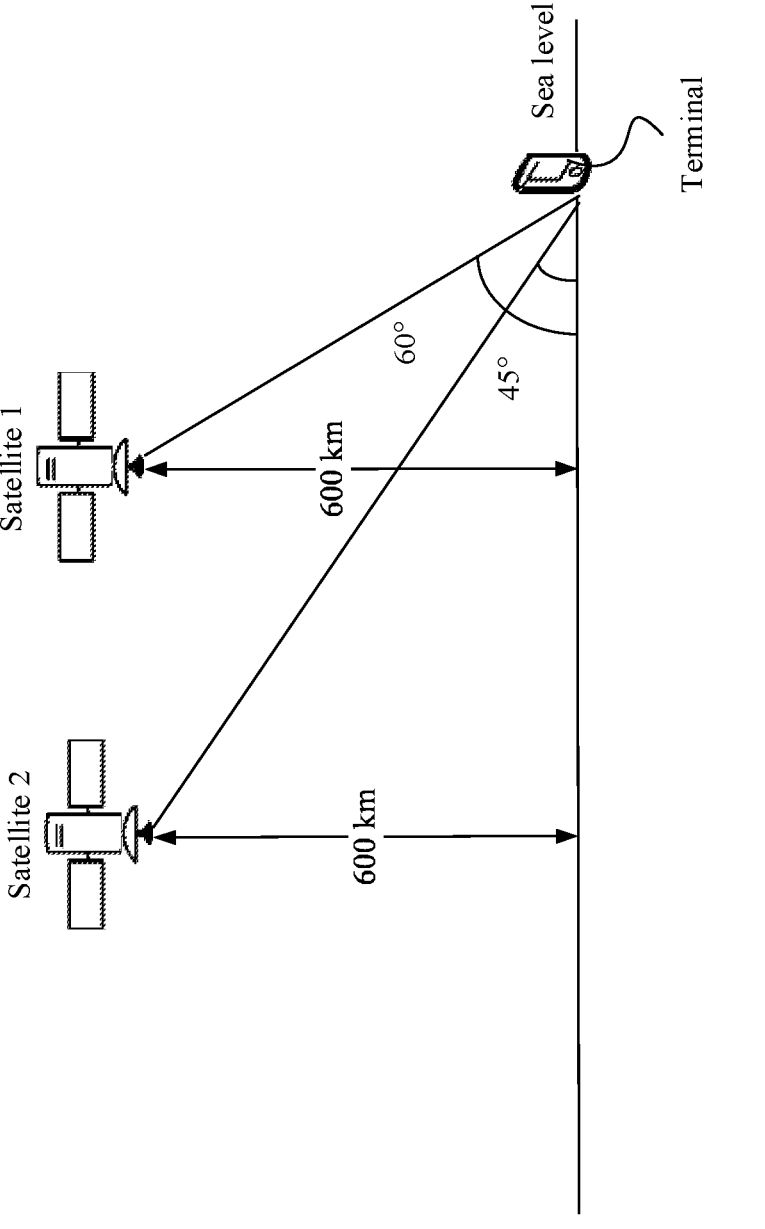
FIG. 1D is a schematic diagram of an elevation angle of a satellite according to an embodiment of this application.

First, an elevation angle of a satellite is described. FIG. 1D is used as an example. FIG. 1D is a schematic diagram of an elevation angle of a satellite according to an embodiment of this application. A satellite 1 and a satellite 2 are used as an example for description. An altitude between the satellite 1 and the sea level is 600 kilometers (km), and an altitude between the satellite 2 and the sea level is 600 km. A distance between a terminal device and the satellite 1 is 683.09 km, and a distance between the terminal device and the satellite 2 is 814.6 km. It may be learned through calculation that an elevation angle of the terminal device relative to the satellite 1 is 60°, and an elevation angle of the terminal device relative to the satellite 2 is 45°.

Second, a technical defect existing in the technology scenario is described.

The terminal apparatus may obtain a round-trip latency and a round-trip latency rate of a service link, Doppler of the service link, and a Doppler rate of the service link based on the position information of the terminal apparatus (a position of the terminal apparatus may be obtained by using a GNSS function) and PVT information of a satellite (which may be obtained based on ephemeris information of the satellite or PVT information sent by the satellite to the UE, for example, in FIG. 1A, x, y, and z represent three-dimensional position coordinates, $\{V_X, V_Y, V_Z\}$ represents velocity coordinates, and t represents time corresponding to a position and a velocity). Use of the round-trip latency of the service link, the round-trip latency rate of the service link, the Doppler of the service link, and the Doppler rate of the service link that are obtained by the terminal apparatus through calculation is similar to that of the common TA, the common TA rate, the Doppler, and the Doppler rate of the feeder link. Details are not described herein again.

As the satellite moves, a relative position between the UE and the satellite, and a position relationship between the satellite and a gateway change, that is, an elevation angle between the terminal apparatus and the satellite changes. The common TA, the common TA rate, the Doppler, the Doppler rate, the round-trip latency and the round-trip latency rate of the service link, the Doppler of the service link, and the Doppler rate of the service link that are obtained by the UE may have deviations. The following analyzes valid duration of the common TA rate and the Doppler rate by using deviations caused by the common TA rate and the Doppler rate for the UE to update a common TA value and a Doppler value as an example.

Figure 2:
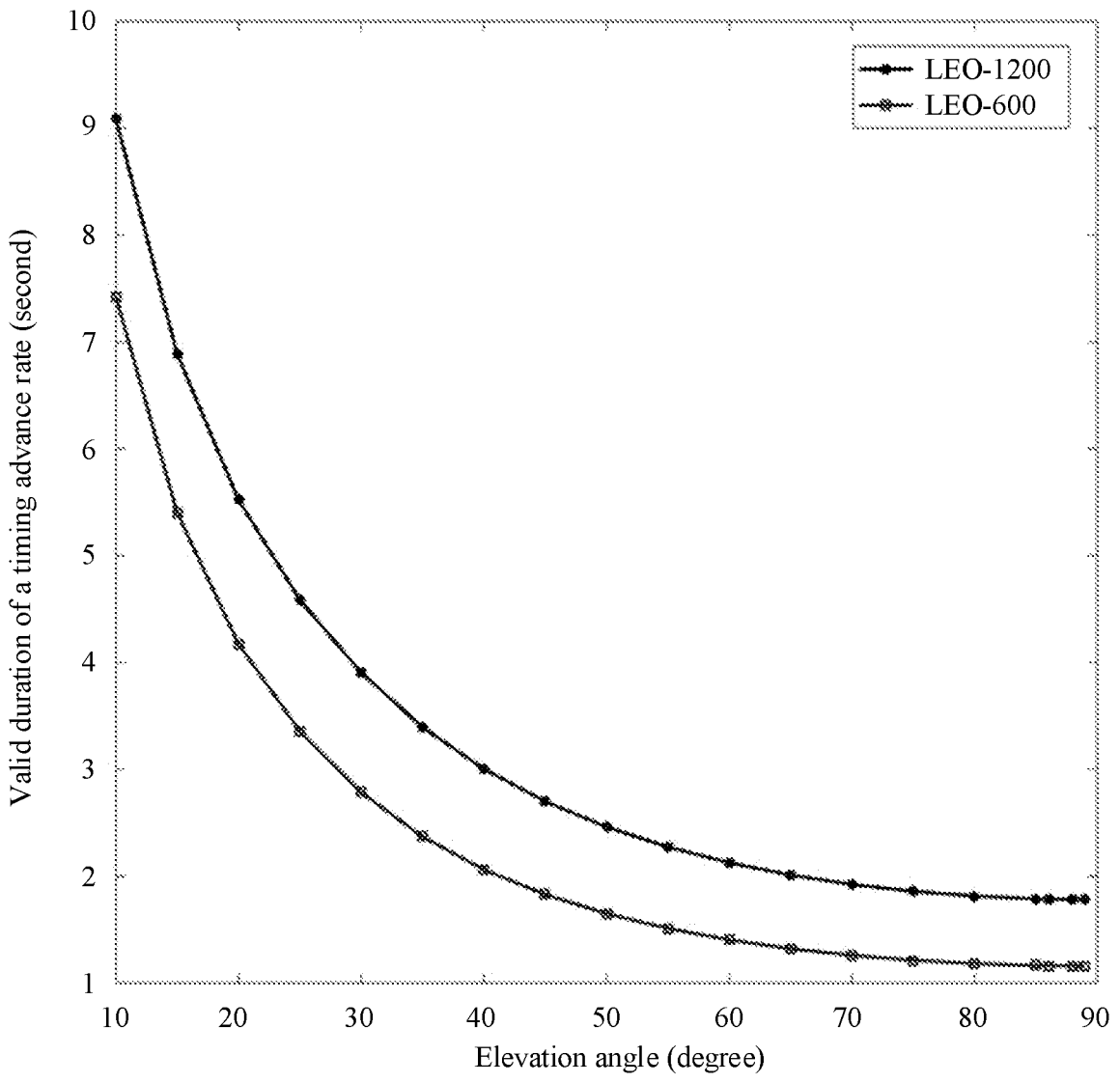
FIG. 2 is a schematic diagram of a curve of valid duration of a common TA rate.

FIG. 2 is a schematic diagram of a curve of valid duration of a common TA rate. FIG. 2 shows, in a low earth orbit (Low Earth Orbit, LEO) satellite communication system, a curve of a relationship between valid duration and elevation angles (satellite elevation angles or communication elevation angles) of the common TA rate in a 600 km low earth orbit satellite communication system (LEO-600) scenario and a 1200 km low earth orbit satellite communication system (LEO-1200) scenario. The valid duration of the common TA rate is a time length for the terminal apparatus to update common TA or TA based on the common TA rate until a difference (namely, an error) between the common TA (or the TA) updated by the terminal apparatus and actually needed common TA (or TA) is greater than an error threshold. For example, the error threshold corresponding to the valid duration shown in FIG. 2 is 12×Ts. $T_s=64T_c$, where Tc represents a time unit $T_c=1/(\Delta f_{max} \cdot N_f)$, $\Delta f_{max}=480 \cdot 10^3$ Hz, $N_f=4096$. Ts=$1/(\Delta f_{ref} \cdot N_{f,ref})$, where $\Delta f_{ref}=15 \cdot 10^3$ Hz, and $N_{f,ref}=2048$. It can be learned from FIG. 2 that the valid duration is affected by an orbit altitude and a communication elevation angle. In the LEO-600 scenario, valid duration of an elevation angle near a lower star point (where an elevation angle is 90 degrees) is less than 2 seconds.

Currently, for a half-duplex terminal apparatus, a maximum length of uplink transmission duration may be greater than 2 seconds. During uplink transmission, the terminal apparatus receives a downlink reference signal by using an uplink gap (UL GAP) to perform downlink time-frequency synchronization. For example, when a time length for transmitting uplink data is 256 milliseconds, a time length of the uplink gap is 40 milliseconds. The uplink gap cannot be used to receive a broadcast message and other downlink information. Therefore, when the uplink data is sent, a relatively large deviation may occur in uplink time-frequency synchronization of the terminal apparatus. Consequently, the terminal apparatus is likely to be disconnected due to a communication failure.

Figure 3:
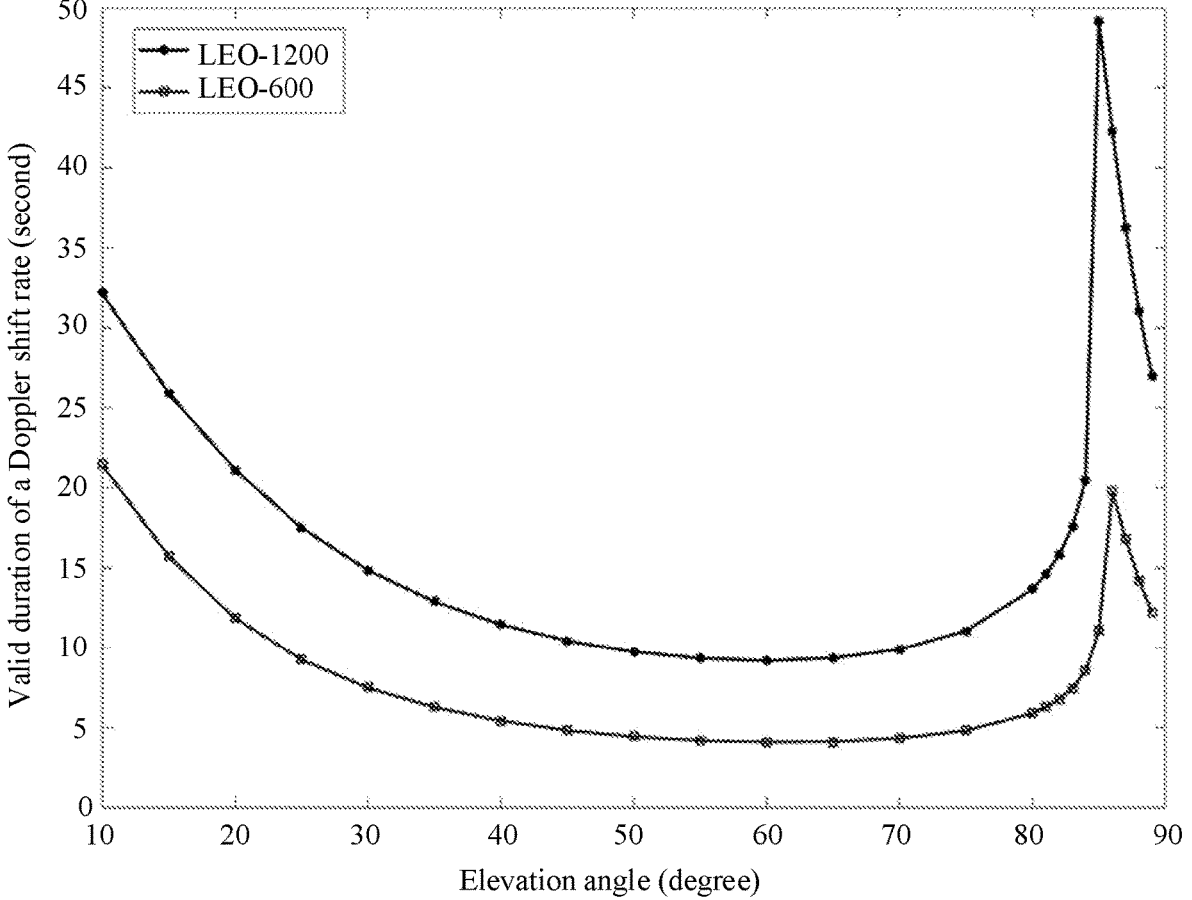
FIG. 3 is a schematic diagram of a curve of valid duration of a Doppler shift rate.

FIG. 3 is a schematic diagram of a curve of valid duration of a Doppler shift rate. FIG. 3 shows, in a low Earth orbit (LEO) satellite communication system, a curve of a relationship between valid duration and elevation angles (satellite elevation angles or communication elevation angles) of the common TA rate in a 600 km low earth orbit satellite communication system (LEO-600) scenario and a 1200 km low earth orbit satellite communication system (LEO-1200) scenario. The valid duration of the Doppler shift rate is a time length for the terminal apparatus to update a Doppler shift (Doppler) based on the Doppler shift rate (Doppler rate) until a difference (namely, an error) between the Doppler shift updated by the terminal apparatus and an actually needed Doppler shift is greater than an error threshold. For example, the error threshold corresponding to the valid duration shown in FIG. 3 is 50 Hertz (Hz). It can be learned from FIG. 3 that the valid duration of the Doppler rate is affected by an orbit altitude and a communication elevation angle. In the LEO-600 scenario, valid duration of a minimum Doppler rate is approximately equal to 4 seconds.

After receiving the Doppler rate sent by the network apparatus, the terminal apparatus may adjust Doppler pre-compensation for an uplink signal feeder link based on the Doppler rate value. After a total time length of uplink signal scheduling, a signal data processing latency, time for waiting to send uplink data, duration for sending the uplink data, and the like that are sent by the network apparatus and that are received by the terminal apparatus is greater than 4 seconds, a Doppler offset may be greater than an error requirement. As a result, decoding performance is affected, and even communication is interrupted.

On this basis, an embodiment of this application provides a parameter update method. A terminal apparatus determines an update period by receiving a parameter that is configured by a network apparatus and that is used to calculate the update period. The terminal apparatus receives an updated uplink time-frequency synchronization parameter based on the update period, where the uplink time-frequency synchronization parameter includes one or more of the following parameters: PVT information of a satellite, common TA, a common TA rate, a Doppler shift, or a Doppler shift rate. The update period indicates a period in which the terminal apparatus periodically receives and updates the uplink time-frequency synchronization parameter. For example, the update period is 2 seconds, and the terminal apparatus receives and updates the uplink time-frequency synchronization parameter at an interval of 2 seconds. The parameter for calculating the update period is configured, so that the terminal apparatus can update the uplink time-frequency synchronization parameter in time. This reduces an error of uplink time-frequency synchronization, and ensures communication quality.

Figure 4:
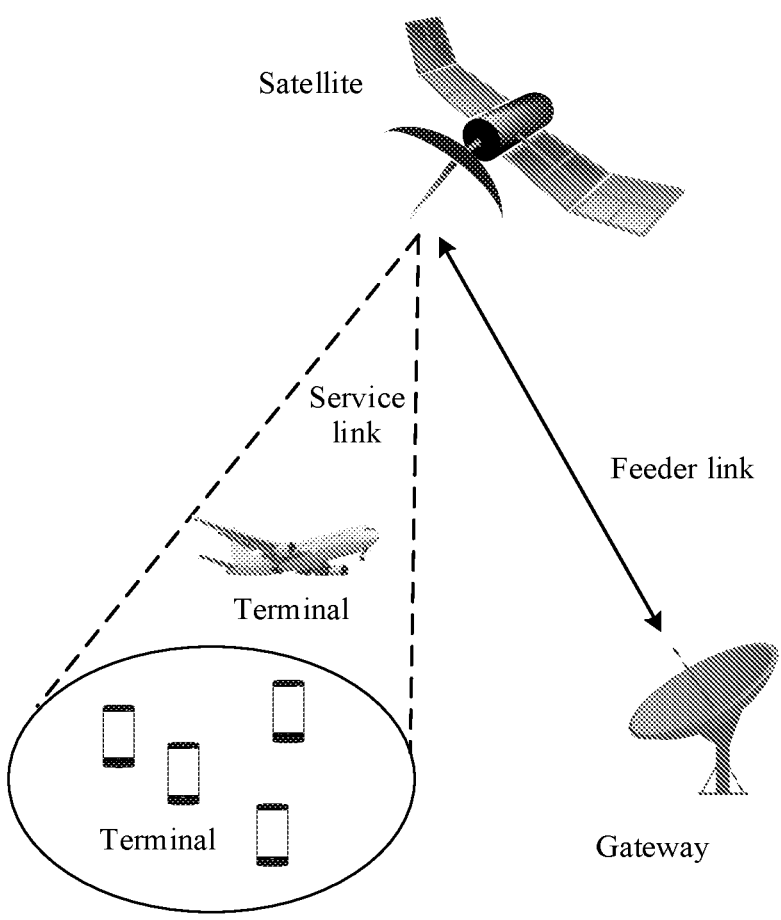
FIG. 4 is a schematic diagram of another application scenario according to an embodiment of this application.

The following describes a method part in embodiments of this application. FIG. 4 is a schematic diagram of another application scenario according to an embodiment of this application. The application scenario shown in FIG. 4 is a satellite communication scenario. A network apparatus in the scenario includes a satellite and a gateway. A terminal apparatus includes a mobile terminal on the ground, a high-altitude aircraft, or the like. A link between the satellite and the terminal apparatus is referred to as a service link, and a link between the satellite and the gateway is referred to as a feeder link.

When the satellite operates in a transparent mode, the satellite has a relay forwarding function. The gateway has all base station functions or some base station functions, and may be considered as a base station. Alternatively, the base station (having a data processing function) and the gateway (having a data forwarding function) may be separately deployed. In this case, a latency of the feeder link includes a latency from the satellite to the gateway and a latency from the gateway to the base station. The transparent mode discussed later is based on an example in which the gateway and the base station are located together or close to each other. If the gateway is far away from the base station, a latency of the feeder link is a sum of the latency from the satellite to the gateway station and the latency from the gateway station to the base station. When the satellite operates in a regenerative mode, the satellite has a data processing capability and all base station functions or some base station functions. The satellite may be considered as a base station.

Figure 5:
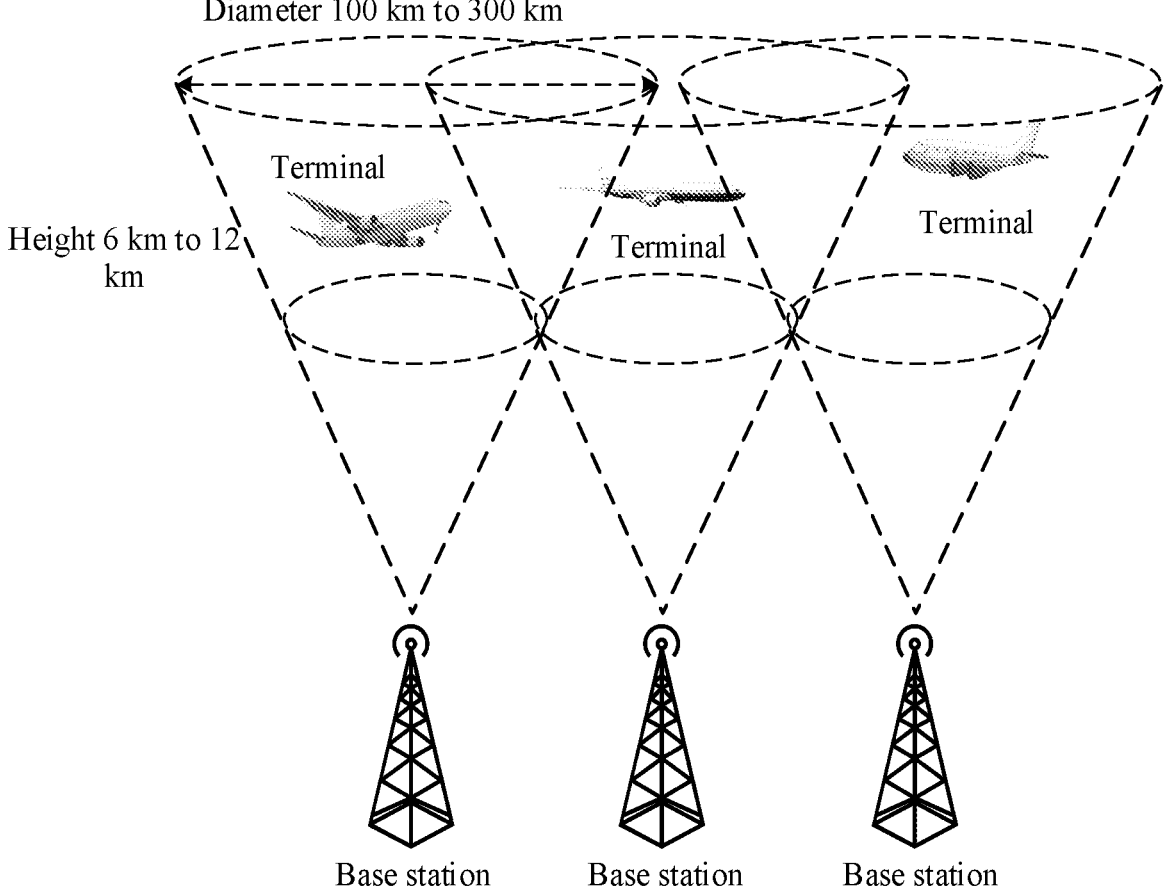
FIG. 5 is a schematic diagram of another application scenario according to an embodiment of this application.

The technical solution provided in this embodiment of this application is also applicable to an air-to-ground (ATG) communication scenario. For example, FIG. 5 is a schematic diagram of another application scenario according to an embodiment of this application. The application scenario shown in FIG. 4 is an ATG communication scenario. A network apparatus includes a ground base station, and a terminal apparatus includes an airplane.

Figure 6A:
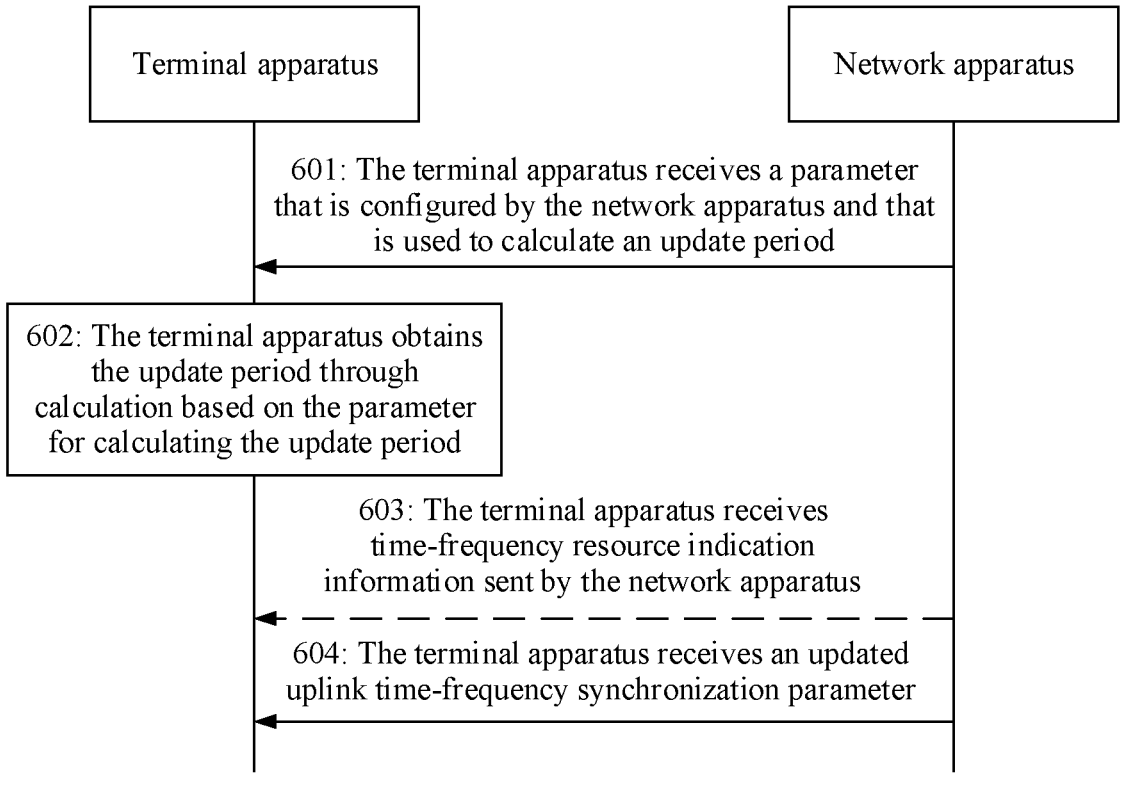
FIG. 6A is a schematic diagram of an embodiment of a parameter update method according to an embodiment of this application.

FIG. 6A is a schematic diagram of an embodiment of a parameter update method according to an embodiment of this application. This embodiment of this application provides a parameter update method. The method includes the following steps.

601: A terminal apparatus receives a parameter that is configured by a network apparatus and that is used to calculate an update period.

In this embodiment, the terminal apparatus receives the parameter that is configured by the network apparatus and that is used to calculate the update period, where the update period is used to indicate time at which the terminal apparatus receives an uplink time-frequency synchronization parameter.

When obtaining, through calculation, the uplink time-frequency synchronization parameter and the parameter for calculating the update period, the network apparatus may determine, based on different application scopes, an uplink time-frequency synchronization parameter and a parameter for calculating the update period.

For example, if the uplink time-frequency synchronization parameter and the parameter for calculating the update period are determined based on a cell level, a reference point may be selected within a cell coverage area to obtain, through calculation, the uplink time-frequency synchronization parameter and the parameter for calculating the update period. The reference point may be a reference point on the ground or a reference point at a specific height above the ground.

The uplink time-frequency synchronization parameter and the parameter for calculating the update period are determined based on a beam level. Similarly, a reference point may be selected within a beam coverage area to obtain, through calculation, the uplink time-frequency synchronization parameter and the parameter for calculating the update period.

The uplink time-frequency synchronization parameter and the parameter for calculating the update period are determined based on a terminal apparatus level. The terminal apparatus may report position information of the terminal apparatus to the network apparatus, and then the network apparatus may determine, based on the position information of the terminal apparatus and position orbit information of a satellite, the uplink time-frequency synchronization parameter of the terminal apparatus and the parameter for calculating the update period. After determining the uplink time-frequency synchronization parameter and the parameter for calculating the update period, the network apparatus may configure these parameters for the terminal apparatus.

Optionally, the network apparatus sends, to the terminal apparatus by using a first message, the parameter for calculating the update period. The first message is an SIB, OSI, an MIB, RRC, DCI, a MAC CE, a TAC, a BWP-DownlinkCommon, and a BWP-UplinkCommon, a BWP-DownlinkDedicated, a BWP-UplinkDedicated, a BWP, or a TCI.

Optionally, the network apparatus may send, to the terminal apparatus along with interaction data, the parameter for calculating the update period.

Optionally, the network apparatus may send, to the terminal apparatus in a separately allocated PDSCH, the parameter used to calculate the update period.

For different application scenarios, the network apparatus may select different first messages to configure, for the terminal apparatus, the parameter for calculating the update period. Descriptions are separately provided below.

When the terminal apparatus needs to perform beam switching or cell switching, before the switching occurs, the network apparatus delivers, to the terminal apparatus, a parameter that needs to be used by the terminal apparatus in a target cell or a target beam and that is used to calculate an update period. This ensures that the terminal apparatus can use the new update period in a relatively short time after being switched to the target cell or the target beam, so that communication continuity is ensured.

When beam switching or BWP switching occurs on the terminal apparatus, if the terminal apparatus is switched to an initial BWP, the network apparatus sends, to the terminal apparatus in RRC signaling corresponding to the BWP, the parameter for calculating the update period; or if the terminal apparatus is switched to another non-initial BWP, the network apparatus may send, to the terminal apparatus in the BWP-DownlinkCommon or the BWP-UplinkCommon, the parameter for calculating the update period.

A measurement procedure may be triggered before beam switching, BWP switching, or cell switching occurs on the terminal apparatus. Therefore, the network apparatus may deliver, by using neighboring cell measurement configuration information or corresponding RRC signaling in a switching process, the parameter that needs to be used by the terminal apparatus in the target cell or the beam and that is used to calculate the update period, for example, may deliver the parameter by using MeasConfig signaling in RRC signaling. In a cell switching procedure, in a BWP (serving BWP) that provides a service, a beam (serving beam) that provides a service, or a cell (serving cell) that provides a service, the parameter for calculating the update period may alternatively be sent to the terminal apparatus by using an RRC reconfiguration (RRC Reconfiguration) message.

602: The terminal apparatus obtains the update period through calculation based on the parameter for calculating the update period.

In this embodiment, the terminal apparatus obtains the update period through calculation based on the parameter for calculating the update period.

There are a plurality of implementation solutions based on different parameters for calculating the update period. Detailed descriptions are provided in subsequent embodiments. Details are not described herein.

603: The terminal apparatus receives time-frequency resource indication information sent by the network apparatus.

In this embodiment, the network apparatus may send the time-frequency resource indication information to the terminal apparatus in the first message. The network apparatus may alternatively send the time-frequency resource indication information to the terminal apparatus in another message. This is not limited herein.

Optionally, the network apparatus may send the time-frequency resource indication information along with interaction data to the terminal apparatus.

Optionally, the network apparatus may send the time-frequency resource indication information to the terminal apparatus in a separately allocated PDSCH.

In another optional implementation, the terminal apparatus determines, based on preconfigured time-frequency resource indication information, the time-frequency resource used to receive an updated uplink time-frequency synchronization parameter.

The time-frequency resource indication information indicates one or more time-frequency resources, where the time-frequency resource includes a subframe, a slot, a symbol, and/or a frequency domain resource.

Figure 6B:
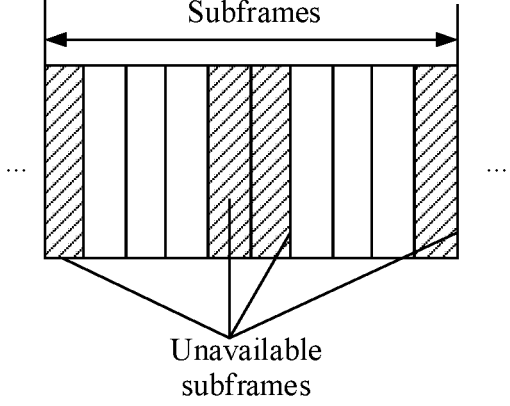
FIG. 6B is a schematic diagram of a structure of a downlink subframe according to an embodiment of this application.

The following uses a subframe as an example for description. FIG. 6B is a schematic diagram of a structure of a downlink subframe according to an embodiment of this application. FIG. 6B shows a subframe set including 10 subframes. A subframe corresponding to a shadow is an unavailable subframe. The unavailable subframe may be a reserved subframe or an occupied subframe. The unavailable subframe may also be referred to as an invalid subframe. The remaining subframes are available subframes, and may also be referred to as valid subframes. The subframe set shown in FIG. 6B is used as an example. In this case, the time-frequency resource indication information sent by the network apparatus to the terminal apparatus may use a 10-bit bitmap. The 10-bit bitmap is "1000110001". "1" indicates that a corresponding subframe is an invalid subframe, and "0" indicates that a corresponding subframe is a valid subframe.

In FIG. 6B, the 10 subframes are used as an example for description. It should be noted that the network apparatus may send a set of 20 or more valid subframes or invalid subframes to the terminal apparatus for indication. The quantity is not limited herein. Optionally, the network apparatus may send, to the terminal apparatus, a valid set including a plurality of subframes, slots, or symbols, namely, a valid frame set, a valid slot set, or a valid symbol set. "Valid" may be understood as not being occupied by another system or the network apparatus to send a broadcast signal, not being occupied by the network apparatus to send a periodic signal, or the like.

The terminal apparatus may receive, on a valid subframe, a valid frame, a valid slot, or a valid symbol resource, a downlink signal (or data or message) sent by another network apparatus. When the terminal receives the downlink signal (or data or message), if an invalid frame, an invalid subframe, an invalid slot, or an invalid symbol resource occurs, the terminal skips the invalid frame, the invalid subframe, the invalid slot, or the invalid symbol resource, and continues to receive, on a next valid frame, valid subframe, valid slot, or valid symbol resource, the downlink data or message sent by the network apparatus.

It may be understood that the terminal apparatus may send, on a valid subframe, a valid frame, a valid slot, or a valid symbol resource, an uplink signal (or data or message) to another network apparatus. When the terminal sends the uplink signal (or data or message), if an invalid frame, an invalid subframe, an invalid slot, or an invalid symbol resource occurs, the terminal skips the invalid frame, the invalid subframe, the invalid slot, or the invalid symbol resource, and continues to send, on a next valid frame, valid subframe, valid slot, or valid symbol resource, the uplink signal, the uplink data, or the uplink message to the network apparatus.

The time-frequency resource indication information may include indication information related to the invalid subframe. In this case, an invalid subframe set is referred to as a non-downlink subframe set. The time-frequency resource indication information may also include indication information related to the valid subframe. In this case, a valid subframe set is referred to as a downlink subframe set. The subframe set may alternatively be an uplink subframe set. In this case, the invalid subframe set is referred to as a non-uplink subframe set, and the valid subframe set is referred to as an uplink subframe set.

Optionally, a time-frequency resource occupied by an update parameter may be added to an invalid downlink frame set, an invalid downlink subframe set, an invalid downlink slot set, or an invalid downlink symbol set, or an invalid uplink frame set, an invalid uplink subframe set, an invalid uplink slot set, or an invalid uplink symbol set. Alternatively, the time-frequency resource occupied by the update parameter may be deleted from a valid downlink frame set, a valid downlink subframe set, a valid downlink slot set, or a valid downlink symbol set, or may be deleted from a valid uplink frame set, a valid uplink subframe set, a valid uplink slot set, or a valid uplink symbol set. That is, the time-frequency resource occupied by the update parameter is marked as an invalid frame set, an invalid subframe set, an invalid slot set, or an invalid symbol set.

604: The terminal apparatus receives the updated uplink time-frequency synchronization parameter.

In this embodiment, the terminal apparatus receives, based on the update period and the time-frequency resource, the uplink time-frequency synchronization parameter updated by the network apparatus. The uplink time-frequency synchronization parameter includes but is not limited to one or more pieces of the following information: PVT information of a satellite, common TA, a common TA rate, a Doppler shift, or a Doppler shift rate. In the PVT information of the satellite, time information may be explicitly indicated, or may be implicitly indicated. This is not limited herein.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality.

Figure 7A:
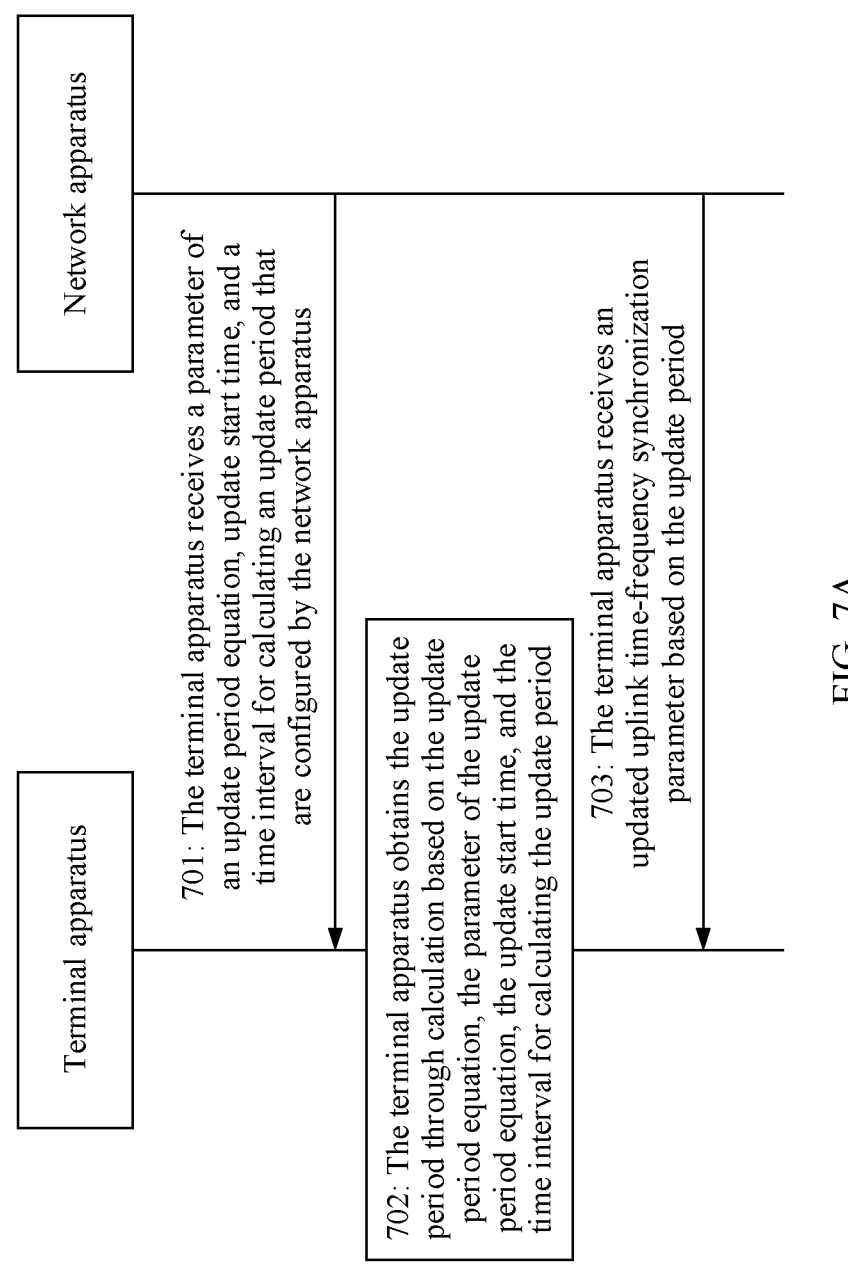
FIG. 7A is a schematic diagram of another embodiment of a parameter update method according to an embodiment of this application.

For different methods for calculating the update period, the network apparatus may configure different parameters for calculating the update period. The following separately provides descriptions with reference to the accompanying drawings. Based on the foregoing embodiment, FIG. 7A is a schematic diagram of another embodiment of the parameter update method according to an embodiment of this application. This embodiment of this application provides a parameter update method. The method includes the following steps.

701: The terminal apparatus receives a parameter of an update period equation, update start time, and a time interval for calculating an update period that are configured by the network apparatus.

In this embodiment, the parameter for calculating the update period includes: the parameter of the update period equation, the update start time, and the time interval for calculating the update period.

The terminal apparatus receives, by using the first message, the parameter of the update period equation, the update start time, and the time interval for calculating the update period that are configured by the network apparatus.

702: The terminal apparatus obtains the update period through calculation based on the update period equation, the parameter of the update period equation, the update start time, and the time interval for calculating the update period.

In this embodiment, the update period equation may be preconfigured in the terminal apparatus. The update period equation may alternatively be configured by the network apparatus. Optionally, the network apparatus configures the update period equation for the terminal apparatus by using the first message.

In an optional implementation, the update period equation is: $y=a \times t^2+b \times t+c$, where $t=T+n \times \Delta T$. a, b, and c are parameters of the update period equation, a is a real number, b is a real number, c is a real number, T is the update start time, $\Delta T$ is the time interval for calculating the update period, n is a quantity of times of calculating the update period, and y is the update period.

For example, the parameters of the update period equation that are configured by the network apparatus are as follows: a=0.1872, b=0.01818, and c=2.542, the update start time is T=−6 seconds, and the time interval for calculating the update period is $\Delta T$=60 seconds. After substituting, into the update period equation, the parameters for calculating the update period, the terminal apparatus obtains y=9.17 (seconds) through calculation. The update period is rounded down to 9 seconds. Optionally, a rounding down manner may be used to provide a shorter update period, and ensure that the terminal apparatus can update the uplink time-frequency synchronization parameter in time. This reduces an error of uplink time-frequency synchronization, and ensures communication quality.

Optionally, a rounding up manner may be used. That is, y=9.17 seconds, and 9.17 seconds are rounded up to 10 seconds.

After calculating the update period (y=9 seconds) once, the terminal apparatus calculates the update period once at an interval of $\Delta T$. To be specific, the terminal apparatus substitutes $t=T+n \times \Delta T$ into the update period equation to obtain the update period through calculation. After calculating the update period for the first time, the terminal apparatus calculates the update period once at an interval of 60 seconds. When the update period is calculated for the first time, t=54 seconds. When the update period is calculated for the second time, t=114 seconds. When the update period is calculated for the third time, t=174 seconds. The rest may be deduced by analogy.

It should be noted that the update period equation may alternatively be an equation in another form. This is not limited herein.

703: The terminal apparatus receives the updated uplink time-frequency synchronization parameter based on the update period.

In this embodiment, the terminal apparatus receives the updated uplink time-frequency synchronization parameter based on the update period (54 seconds, 114 seconds, 174 seconds, or the like) obtained through calculation. This step is similar to step 604. Details are not described herein again.

Figure 7B:
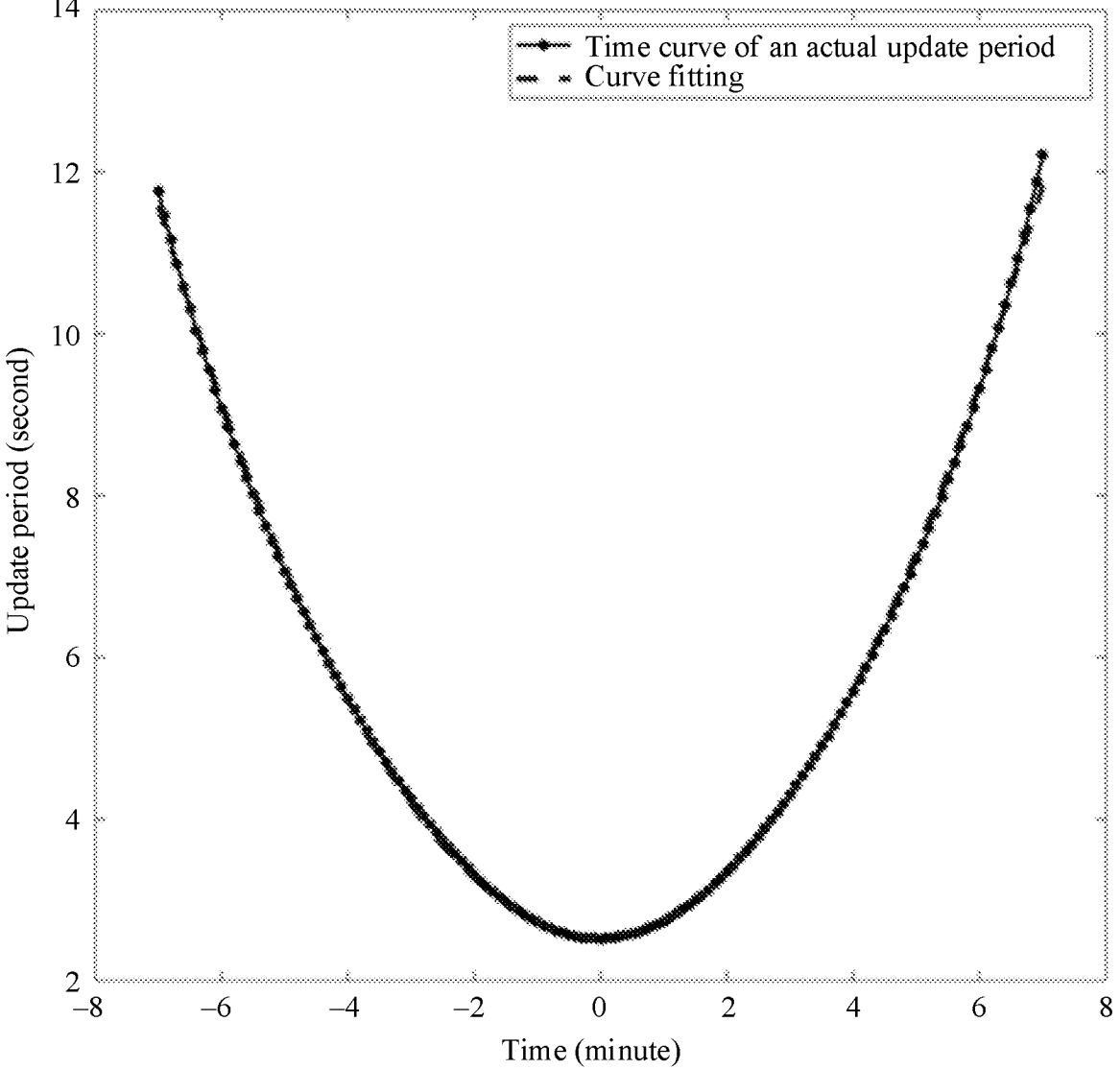
FIG. 7B is a schematic diagram of a simulation experiment according to an embodiment of this application.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. The network apparatus needs to configure, for only once, the parameter for calculating the update period, so that signaling overheads are reduced. FIG. 7B is a schematic diagram of a simulation experiment according to an embodiment of this application. It can be learned from FIG. 7B that an update curve equation configured in the terminal apparatus is highly fit with a time curve of an actual update period. Therefore, an update period obtained by using the update curve equation is closer to the actual update period, to ensure communication quality of the terminal apparatus.

Figure 8:
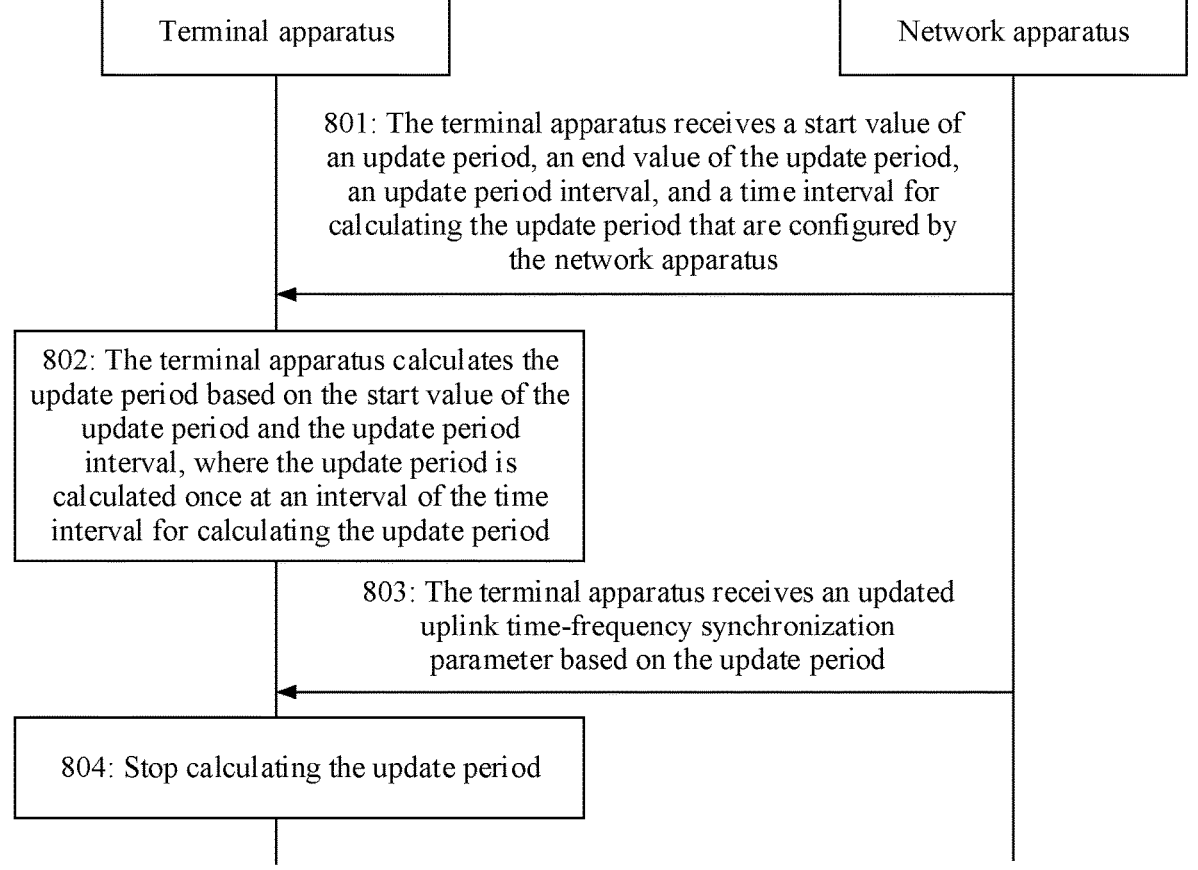
FIG. 8 is a schematic diagram of another embodiment of a parameter update method according to an embodiment of this application.

FIG. 8 is a schematic diagram of another embodiment of the parameter update method according to an embodiment of this application. This embodiment of this application provides a parameter update method. The method includes the following steps.

801: The terminal apparatus receives a start value of the update period, an end value of the update period, an update period interval, and a time interval for calculating the update period that are configured by the network apparatus.

In this embodiment, the network apparatus configures, for the terminal apparatus based on related information such as PVT information, orbit information, and/or a communication elevation angle (or a communication elevation angle range) of a satellite, the parameter for calculating the update period. The parameter for calculating the update period includes: the start value of the update period, the end value of the update period, the update period interval, and the time interval for calculating the update period.

The terminal apparatus receives, by using the first message, the start value of the update period, the end value of the update period, the update period interval, and the time interval for calculating the update period that are configured by the network apparatus. In this embodiment, for ease of description, the start value of the update period is referred to as "Period 1", the end value of the update period is referred to as "Period 2", the update period interval is referred to as "Δperiod", and the time interval for calculating the update period is referred to as "ΔT".

802: The terminal apparatus calculates the update period based on the start value of the update period and the update period interval, where the update period is calculated once at an interval of the time interval for calculating the update period.

In this embodiment, the terminal apparatus calculates the update period based on the start value of the update period and the update period interval, where the update period is calculated once at the interval of the time interval for calculating the update period.

First, the update period is calculated once at an interval of ΔT. For example, ΔT=60 seconds. After 60 seconds, the terminal apparatus obtains, based on the start value Period 1 of the update period and the update period interval Δperiod, an update period obtained through the first calculation, where the update period obtained through first calculation=Period 1+Δperiod. The update period is calculated once at the interval of ΔT. After 120 seconds (2×ΔT), the terminal apparatus obtains, based on the update period (Period 1+Δperiod) obtained through the first calculation and Δperiod, an update period obtained through second calculation, where the update period obtained through the second calculation=Period 1+2×Δperiod. By analogy, a newly calculated update period "Period_new"=the start value "Period 1" of the update period+n×ΔPeriod, where n is a quantity of times of calculating the update period.

803: The terminal apparatus receives the updated uplink time-frequency synchronization parameter based on the update period.

In this embodiment, first, the terminal apparatus receives the updated uplink time-frequency synchronization parameter based on the start value Period 1 of the update period. Second, the terminal apparatus receives the updated uplink time-frequency synchronization parameter based on an update period obtained through each calculation. This step is similar to step 604. Details are not described herein again.

804: Stop calculating the update period.

In this embodiment, when the update period interval is greater than 0, and the update period is greater than or equal to the end value of the update period, calculation is stopped; or when the update period interval is less than 0, and the update period is less than or equal to the end value of the update period, calculation is stopped.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios.

Figure 9:
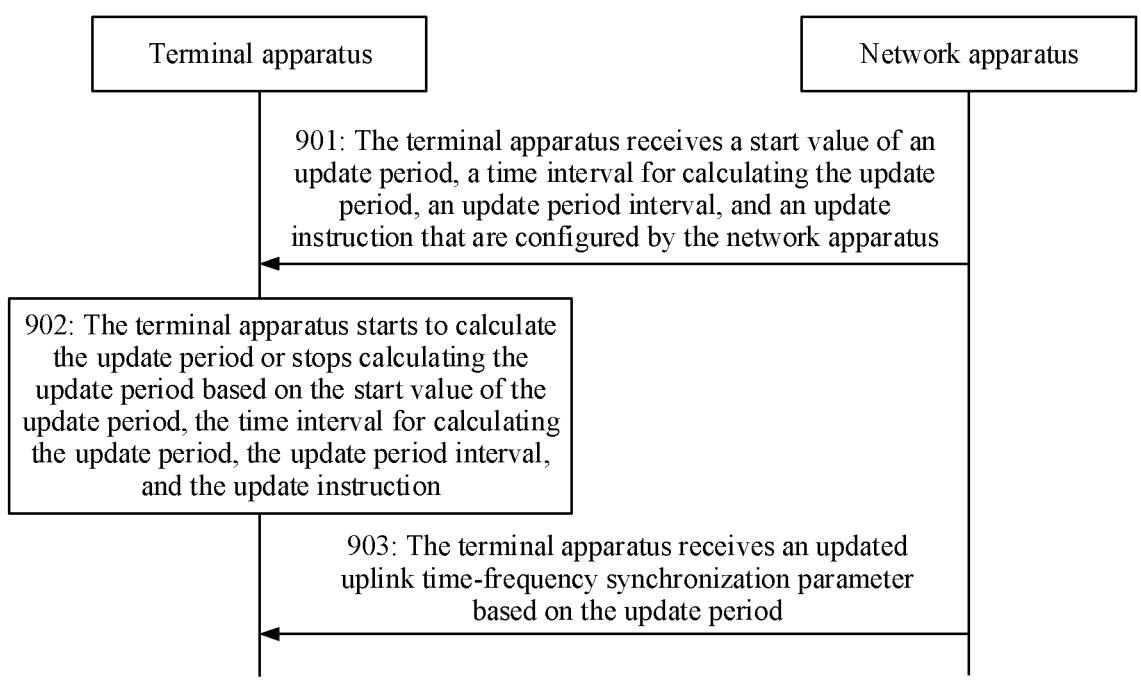
FIG. 9 is a schematic diagram of another embodiment of a parameter update method according to an embodiment of this application.

FIG. 9 is a schematic diagram of another embodiment of the parameter update method according to an embodiment of this application. This embodiment of this application provides a parameter update method. The method includes the following steps.

901: The terminal apparatus receives a start value of the update period, a time interval for calculating the update period, an update period interval, and an update instruction that are configured by the network apparatus.

In this embodiment, the network apparatus configures, for the terminal apparatus based on related information such as PVT information, orbit information, and/or a communication elevation angle (or a communication elevation angle range) of a satellite, the parameter for calculating the update period. The parameter for calculating the update period includes: the start value of the update period, the update period interval, and the time interval for calculating the update period.

The terminal apparatus receives, by using the first message, the start value of the update period, the update period interval, and the time interval for calculating the update period that are configured by the network apparatus. The terminal apparatus receives the update instruction from the network apparatus by using another message, where the update instruction may be carried in any type of message shown in the first message.

902: The terminal apparatus starts to calculate the update period or stops calculating the update period based on the start value of the update period, the time interval for calculating the update period, the update period interval, and the update instruction.

In this embodiment, the terminal apparatus calculates the update period based on the start value of the update period and the update period interval, where the update period is calculated once at an interval of the time interval for calculating the update period.

First, the update period is calculated once at an interval of ΔT. For example, ΔT=60 seconds. After 60 seconds, the terminal apparatus obtains, based on the start value Period 1 of the update period and the update period interval Δperiod, an update period obtained through the first calculation, where the update period obtained through first calculation=Period 1+Δperiod. The update period is calculated once at the interval of ΔT. After 120 seconds (2×ΔT), the terminal apparatus obtains, based on the update period (Period 1+Δperiod) obtained through the first calculation and Δperiod, an update period obtained through second calculation, where the update period obtained through the second calculation=Period 1+2×Δperiod. By analogy, a newly calculated update period "Period_new"=the start value "Period 1" of the update period+n×ΔPeriod, where n is a quantity of times of calculating the update period.

In an optional implementation, the terminal apparatus starts to calculate the update period or stops calculating the update period based on the update instruction. When a bit that is in the update instruction and that is used to indicate the terminal apparatus to calculate the update period is "1", the terminal apparatus calculates (or starts to calculate) the update period based on the update instruction; or when a bit that is in the update instruction and that is used to indicate the terminal apparatus to calculate the update period is "0", the terminal apparatus stops calculating the update period based on the update instruction.

In another optional implementation, the terminal apparatus continuously calculates the update period based on the parameter for calculating the update period. However, the terminal apparatus uses, based on an indication of the update instruction, the update period obtained through calculation. When a bit that is in the update instruction and that is used to indicate the terminal apparatus to use the update period is "1", the terminal apparatus uses, based on the update instruction, the update period obtained through calculation; or when a bit that is in the update instruction and that is used to indicate the terminal apparatus to use the update period is "0", the terminal apparatus reuses, based on the update instruction, the update period obtained through previous calculation (or an update period pre-configured in the terminal apparatus), that is, does not update the update period.

903: The terminal apparatus receives the updated uplink time-frequency synchronization parameter based on the update period.

In this embodiment, first, the terminal apparatus receives the updated uplink time-frequency synchronization parameter based on the start value Period 1 of the update period. Second, the terminal apparatus receives the updated uplink time-frequency synchronization parameter based on an update period obtained through each calculation. This step is similar to step 604. Details are not described herein again.

In an optional implementation, the terminal apparatus determines, based on the update instruction, to receive the update period of the updated uplink time-frequency synchronization parameter.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios.

Figure 10:
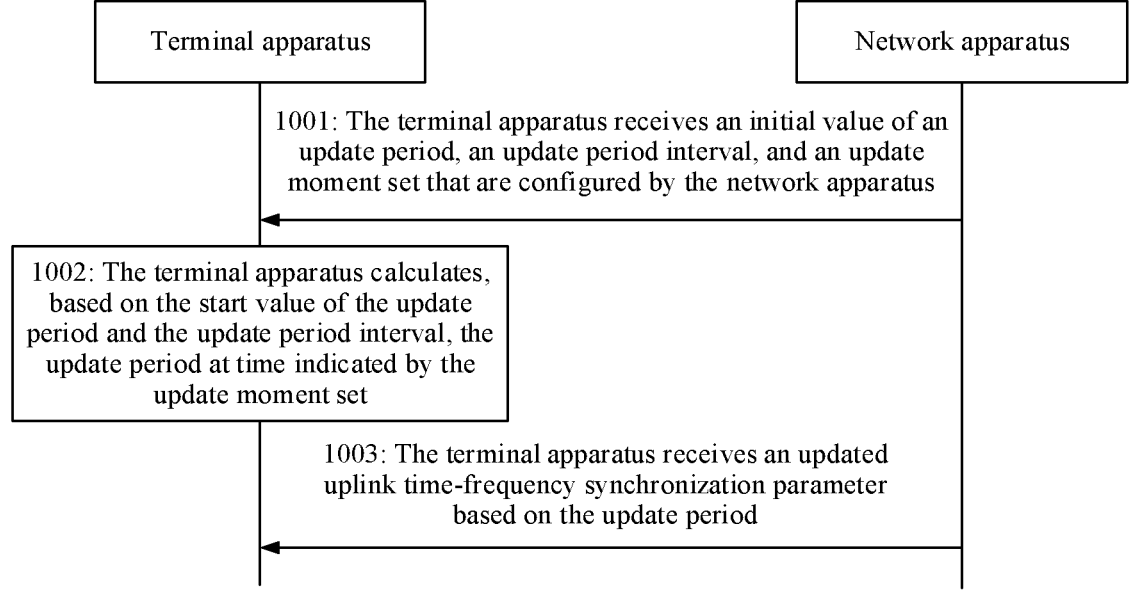
FIG. 10 is a schematic diagram of another embodiment of a parameter update method according to an embodiment of this application.

FIG. 10 is a schematic diagram of another embodiment of the parameter update method according to an embodiment of this application. This embodiment of this application provides a parameter update method. The method includes the following steps.

1001: The terminal apparatus receives an initial value of the update period, an update period interval, and an update moment set that are configured by the network apparatus.

In this embodiment, the parameter for calculating the update period includes: the initial value of the update period, the update period interval, and the update moment set.

The terminal apparatus receives, by using the first message, the initial value of the update period, the update period interval, and the update moment set that are configured by the network apparatus. In this embodiment, the initial value of the update period and the update period interval are similar to those in the foregoing embodiments. Details are not described herein again.

For the update moment set, the update moment set includes one or more moments, and the update moment set is used to indicate time at which the terminal apparatus calculates the update period. For example, the update moment set includes T1, T2, T3, . . . , and Tx, where x is a positive integer.

In an optional implementation, T1, T2, T3, . . . , and Tx may be represented by using absolute time. For example, T1, T2, T3, . . . , and Tx are represented by using UTC. The UE updates the update period at the UTC time T1, T2, T3, . . . , and Tx.

In another optional implementation, T1, T2, T3, . . . , and Tx may be represented by using a time difference. T1 may be represented by using absolute time or relative time. For example, the relative time T1 may be represented by using an end position of a frame in which the parameter for calculating the update period is transmitted. For another example, the relative time T1 may be represented by using end time of any frame. For another example, the relative time T1 may be represented by using end time of any subframe, or the relative time T1 may be represented by using end time of any slot. The moments T2, T3, . . . , and Tx represent time differences. A time unit of the moment may be represented by using 1 millisecond, 0.5 millisecond, a slot length, or the like. This is not limited herein.

1002: The terminal apparatus calculates, based on the start value of the update period and the update period interval, the update period at the time indicated by the update moment set.

In this embodiment, the terminal apparatus calculates, based on the start value of the update period and the update period interval, the update period at the time indicated by the update moment set.

The update period is calculated at the time indicated by the update moment set. At the moment T1, the terminal apparatus obtains, based on the start value Period 1 of the update period and the update period interval Δperiod, an update period obtained through first calculation, where the update period obtained through the first calculation=Period 1+Δperiod. At the moment T2, the terminal apparatus obtains, based on the update period (Period 1+Δperiod) obtained through the first calculation and Δperiod, an update period obtained through second calculation, where the update period obtained through the second calculation=Period 1+2×Δperiod. By analogy, at the moment Tx, a newly calculated update period "Period_new"=the start value "Period 1" of the update period+x×ΔPeriod, where x is a total quantity of moments in the update moment set. After the moment Tx, calculating of the update period is stopped.

In another optional implementation, the terminal apparatus uses the start value Period 1 of the update period at the moment T1; calculates the update period at a moment (T1+T2), where a calculated update period "Period_new"=the start value "Period 1" of the update period+ΔPeriod, and uses the newly calculated update period; and calculates the update period at a moment (T1+

T2+T3), where "Period_new"="Period 1"+2×ΔPeriod. The rest may be deduced by analogy until an update moment is (T1+T2+T3+ . . . +Tx). An update period calculated at the moment (T1+T2+T3+ . . . +Tx) is: "Period_new"="Period 1"+(x−1)×ΔPeriod. The start value of the update period may alternatively be preconfigured in the terminal apparatus. This is not limited herein.

1003: The terminal apparatus receives the updated uplink time-frequency synchronization parameter based on the update period.

In this embodiment, the terminal apparatus receives the updated uplink time-frequency synchronization parameter based on the update period.

It should be noted that the network apparatus needs to send the updated uplink time-frequency synchronization parameter to the terminal apparatus based on a same update moment set. This step is similar to step 604. Details are not described herein again.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. In this solution, the time interval for calculating the update period is not limited, and the time for calculating the update period may be flexibly specified, so that implementation flexibility is improved.

Figure 11:
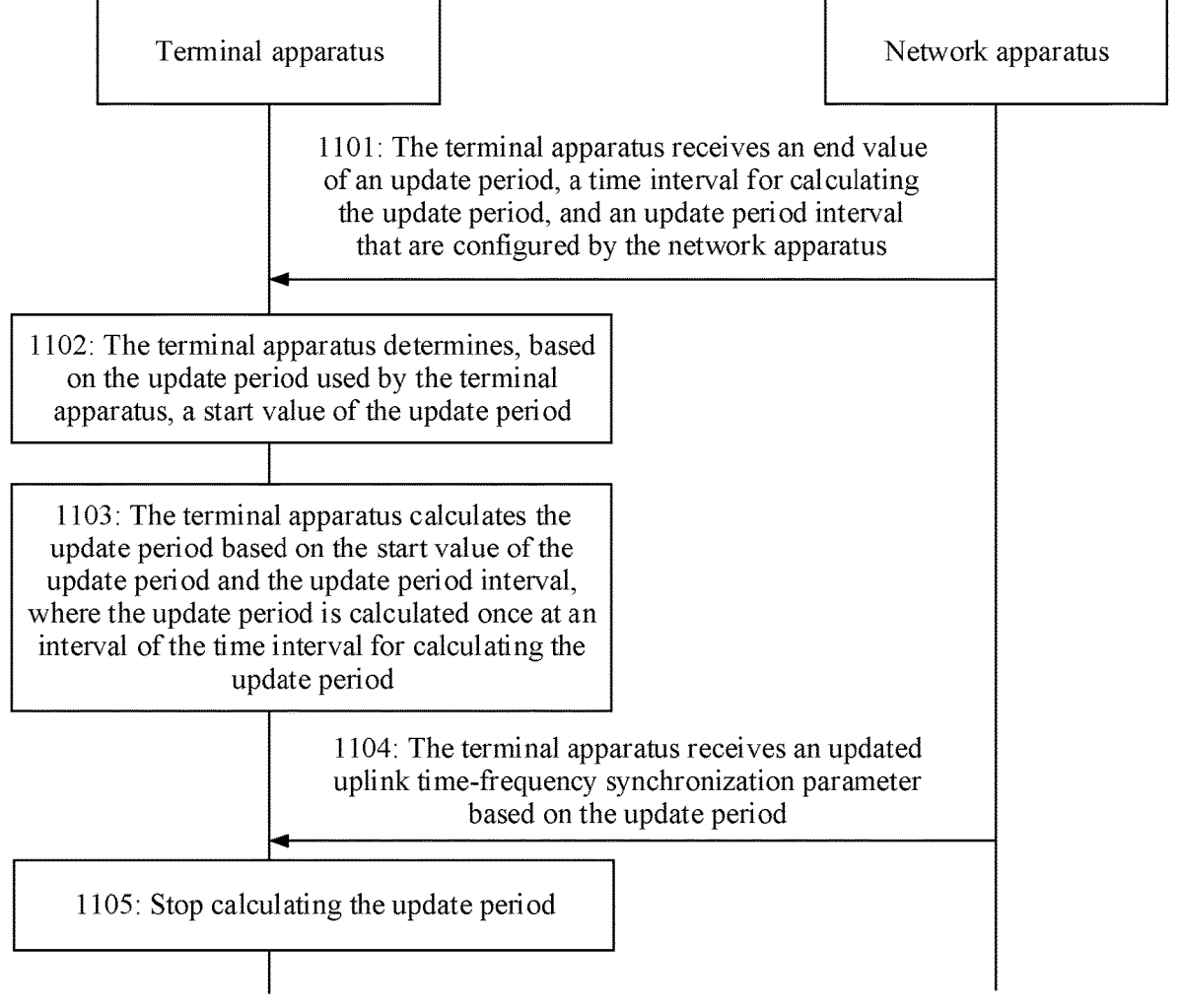
FIG. 11 is a schematic diagram of another embodiment of a parameter update method according to an embodiment of this application.

FIG. 11 is a schematic diagram of another embodiment of the parameter update method according to an embodiment of this application. This embodiment of this application provides a parameter update method. The method includes the following steps.

1101: The terminal apparatus receives an end value of the update period, a time interval for calculating the update period, and an update period interval that are configured by the network apparatus.

In this embodiment, the network apparatus configures, for the terminal apparatus based on related information such as PVT information, orbit information, and/or a communication elevation angle (or a communication elevation angle range) of a satellite, the parameter for calculating the update period. The parameter for calculating the update period includes: the end value of the update period, the time interval for calculating the update period, and the update period interval.

The terminal apparatus receives, by using the first message, the end value of the update period, the time interval for calculating the update period, and the update period interval that are configured by the network apparatus.

In another optional implementation, the network apparatus configures, for the terminal apparatus based on related information such as PVT information, orbit information, and/or a communication elevation angle (or a communication elevation angle range) of a satellite, the parameter for calculating the update period. The parameter for calculating the update period includes: end time for calculating the update period, the time interval for calculating the update period, and the update period interval.

In another optional implementation, the network apparatus configures, for the terminal apparatus based on related information such as PVT information, orbit information, and/or a communication elevation angle (or a communication elevation angle range) of a satellite, the parameter for calculating the update period. The parameter for calculating the update period includes: a quantity of times of calculating the update period, the time interval for calculating the update period, and the update period interval.

1102: The terminal apparatus determines, based on the update period used by the terminal apparatus, a start value of the update period.

In this embodiment, the terminal apparatus determines, based on the update period used by the terminal apparatus, the start value of the update period.

For example, when the update period used by the terminal apparatus is 5 seconds, the terminal apparatus determines that the start value of the update period is 5 seconds.

1103: The terminal apparatus calculates the update period based on the start value of the update period and the update period interval, where the update period is calculated once at an interval of the time interval for calculating the update period.

In this embodiment, in an optional implementation, the terminal apparatus calculates the update period based on the start value of the update period and the update period interval, where the update period is calculated once at an interval of the time interval for calculating the update period.

First, the update period is calculated once at an interval of ΔT. For example, ΔT=60 seconds. After 60 seconds, the terminal apparatus obtains, based on the start value Period 1 of the update period and the update period interval Δperiod, an update period obtained through first calculation, where the update period obtained through the first calculation=Period 1+Δperiod. The update period is calculated once at an interval of ΔT. After 120 seconds (2×ΔT), the terminal apparatus obtains, based on the update period (Period 1+Δperiod) obtained through the first calculation and Δperiod, an update period obtained through second calculation, where the update period obtained through the second calculation=Period 1+2×Δperiod. By analogy, a newly calculated update period "Period_new"=the start value "Period 1" of the update period+n×ΔPeriod, where n is a quantity of times of calculating the update period.

In another optional implementation, the parameter that is configured by the network apparatus and that is used to calculate the update period is: the end time for calculating the update period, the time interval for calculating the update period, and the update period interval.

The terminal apparatus calculates the update period based on the start value Period 1 (which is configured by the network apparatus, or determined by the terminal apparatus based on a used update period) of the update period, the update period interval Δperiod, the time interval ΔT for calculating the update period, and the end time T_boundary for calculating the update period. Details are as follows:

The terminal apparatus updates the update period once at an interval of ΔT, that is, a newly calculated update period "Period_new"=the start value "Period 1" of the update period+n×the update period interval Δperiod, where n is a quantity of times of calculating the update period.

In another optional implementation, the parameter that is configured by the network apparatus and that is used to calculate the update period is: the quantity of times of calculating the update period, the time interval for calculating the update period, and the update period interval.

The terminal apparatus calculates the update period based on the start value Period 1 (which is configured by the network apparatus, or determined by the terminal apparatus based on a used update period) of the update period, the update period interval Δperiod, the time interval ΔT for calculating the update period, and the quantity N_boundary of times of calculating the update period. Details are as follows:

The terminal apparatus updates the update period once at an interval of ΔT, that is, a newly calculated update period "Period_new"=the start value "Period 1" of the update period+n×the update period interval Δperiod, where n is the quantity of times of calculating the update period.

1104: The terminal apparatus receives the updated uplink time-frequency synchronization parameter based on the update period.

In this embodiment, first, the terminal apparatus receives the updated uplink time-frequency synchronization parameter based on the start value Period 1 of the update period. Second, the terminal apparatus receives the updated uplink time-frequency synchronization parameter based on an update period obtained through each calculation. This step is similar to step 604. Details are not described herein again.

1105: Stop calculating the update period.

In this embodiment, in an optional implementation, when the update period interval is greater than 0, and the update period is greater than or equal to the end value of the update period, calculation is stopped; or when the update period interval is less than 0, and the update period is less than or equal to the end value of the update period, calculation is stopped.

In another optional implementation, the parameter that is configured by the network apparatus and that is used to calculate the update period is: the end time for calculating the update period, the time interval for calculating the update period, and the update period interval.

The terminal apparatus calculates the update period based on the start value Period 1 (which is configured by the network apparatus, or determined by the terminal apparatus based on a used update period) of the update period, the update period interval Δperiod, the time interval ΔT for calculating the update period, and the end time T_boundary for calculating the update period. Details are as follows:

The terminal apparatus updates the update period once at an interval of ΔT, that is, a newly calculated update period "Period_new"=the start value "Period 1" of the update period+n×the update period interval Δperiod, where n is the quantity of times of calculating the update period.

By analogy, until time reaches the end time T_boundary for calculating the update period, the terminal apparatus stops calculating the update period. The T_boundary may be absolute time, for example, UTC, or may be a relative time length. For example, T_boundary=1 minute, indicating that a time length for the terminal device to continuously calculate the update period by using the received parameters is 1 minute, and the terminal apparatus stops calculating the update period after 1 minute.

In another optional implementation, the parameter that is configured by the network apparatus and that is used to calculate the update period is: the quantity of times of calculating the update period, the time interval for calculating the update period, and the update period interval.

The terminal apparatus calculates the update period based on the start value Period 1 (which is configured by the network apparatus, or determined by the terminal apparatus based on a used update period) of the update period, the update period interval Δperiod, the time interval ΔT for calculating the update period, and the quantity N_boundary of times of calculating the update period. Details are as follows:

The terminal apparatus updates the update period once at an interval of ΔT, that is, a newly calculated update period "Period_new"=the start value "Period 1" of the update period+n×the update period interval Δperiod, where n is the quantity of times of calculating the update period.

By analogy, until the quantity of times of calculating the update period reaches the quantity N_boundary of times of calculating the update period that is configured by the network apparatus, the terminal apparatus stops calculating the update period. The quantity N_boundary of times of calculating the update period is a nonnegative integer.

In this embodiment of this application, the network apparatus configures the parameter for calculating the update period, so that the terminal apparatus can update the uplink time-frequency synchronization parameter in time. This reduces an error of uplink time-frequency synchronization, and ensures communication quality. For a scenario in which a satellite orbit is complex, for example, when a satellite is a non-circular orbit, the network apparatus uses segmental linear fitting in this solution to configure, for the terminal apparatus, the parameter for calculating the update period. This solution is applicable to a plurality of communication scenarios. Because the end value of the update period can be flexibly set, implementation flexibility of the solution is improved.

Figure 12:
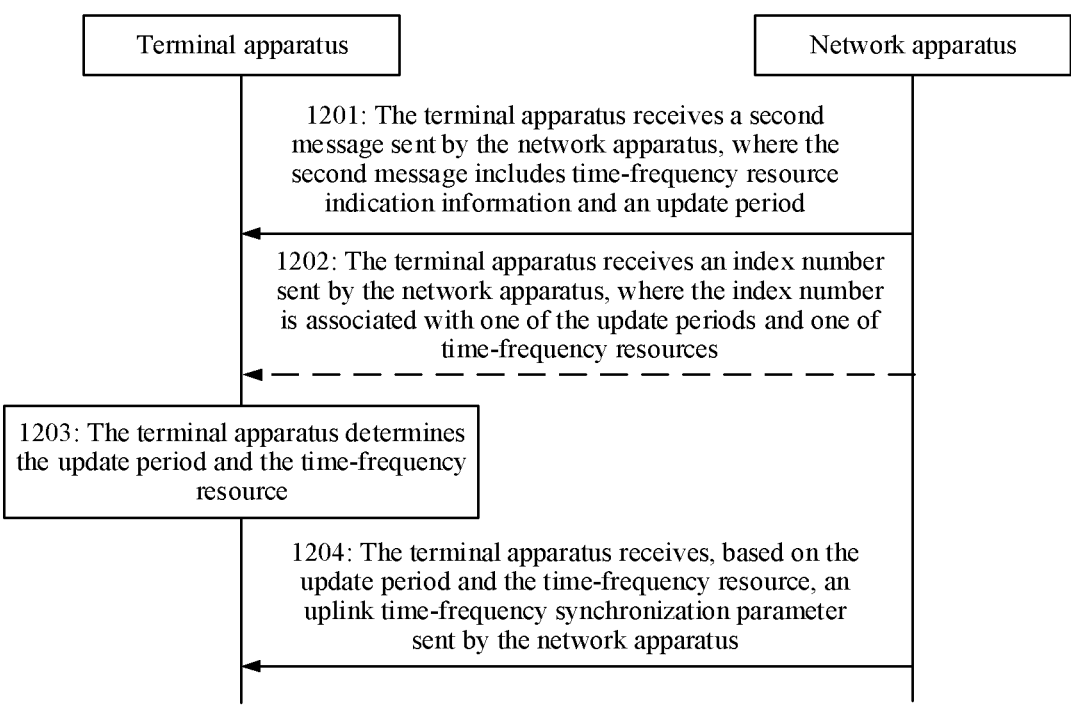
FIG. 12 is a schematic diagram of another embodiment of a parameter update method according to an embodiment of this application.

FIG. 12 is a schematic diagram of another embodiment of the parameter update method according to an embodiment of this application. This embodiment of this application provides a parameter update method. The method includes the following steps.

1201: The terminal apparatus receives a second message sent by the network apparatus, where the second message includes time-frequency resource indication information and an update period.

In this embodiment, in an optional implementation, the terminal apparatus receives the second message sent by the network apparatus, where the second message includes the time-frequency resource indication information and the update period. The terminal apparatus receives one or more second messages sent by the network apparatus. Each time after receiving the second message, the terminal apparatus determines, based on the time-frequency resource indication information and the update period that are included in the second message, the time-frequency resource and the update period that need to be used to receive an uplink time-frequency synchronization parameter sent by the network apparatus. For example, when the time-frequency resource included in the second message is a first subframe, and the update period is 4 seconds, the terminal apparatus receives, by using the first subframe and the update period of 4 seconds, the uplink time-frequency synchronization parameter sent by the network apparatus.

In another optional implementation, the second message includes indication information of a plurality of time-frequency resources and a plurality of update periods, and the second message further includes an index number. The index number is associated with one of the update periods and one of the time-frequency resources.

For example, the second message carries an index list. The index list includes the time-frequency resource indication information, the update period, and the index number. The network apparatus may send the index list to the terminal apparatus by using RRC signaling or a broadcast message (for example, an SIB 1). The index list is shown in Table 1.

TABLE 1

| Index number | Update period and time-frequency resource |
|---|---|
| 0 | Period 1, and time-frequency resource 1 |
| 1 | Period 2, and time-frequency resource 2 |

TABLE 1-continued

| Index number | Update period and time-frequency resource |
|---|---|
| 2 | Period 3, and time-frequency resource 3 |
| 3 | Period 4, and time-frequency resource 4 |

For example, the index list may further carry the time-frequency resource and the parameter for calculating the update period. The index list is shown in Table 2.

TABLE 2

| Index number | Time-frequency resource and parameter for calculating the update period |
|---|---|
| 0 | [Period 1 (start value of the update period), Period 2 (end value of the update period)], $\Delta$Period 1, $\Delta$T1, and time-frequency resource 1 |
| 1 | [Period 3 (start value of the update period), Period 4 (end value of the update period)], $\Delta$Period 2, $\Delta$T2, and time-frequency resource 2 |
| 2 | [Period 5 (start value of the update period), Period 6 (end value of the update period)], $\Delta$Period 3, $\Delta$T3, and time-frequency resource 3 |
| 3 | [Period 7 (start value of the update period), Period 8 (end value of the update period)], $\Delta$Period 4, $\Delta$T4, and time-frequency resource 4 |

Optionally, the network apparatus configures, for the terminal apparatus by using another message, the update period or the parameter for calculating the update period, for example, by using DCI signaling. A reserved bit in the DCI signaling is used to transmit the update period or the parameter for calculating the update period.

1202: The terminal apparatus receives the index number sent by the network apparatus, where the index number is associated with one of the update periods and one of the time-frequency resources.

In this embodiment, after the network apparatus configures the index list for the terminal apparatus, the network apparatus sends the index number to the terminal apparatus, to indicate the terminal apparatus to use the update period and the time-frequency resource to receive the uplink time-frequency synchronization parameter, or indicate the terminal apparatus to use a group of parameters for calculating the update period and time-frequency resources to receive the uplink time-frequency synchronization parameter.

For example, the network apparatus sends the index number to the terminal apparatus by using DCI signaling. The index number may be transmitted by using a reserved bit in the DCI signaling, or may be transmitted by using another bit in the DCI signaling. This is not limited herein.

It should be noted that step 1202 is an optional step, and step 1202 is performed only after the network apparatus configures the index list for the terminal apparatus.

1203: The terminal apparatus determines the update period and the time-frequency resource.

In this embodiment, in an optional implementation, the terminal apparatus determines the update period and the time-frequency resource based on the second message.

In another optional implementation, the terminal apparatus determines the update period and the time-frequency resource based on the index list configured in the second message and the index number from the network apparatus.

In another optional implementation, the terminal apparatus determines, based on the index list configured in the second message and the index number from the network apparatus, the time-frequency resource and the parameter for calculating the update period. The terminal apparatus determines the update period based on the parameter for calculating the update period.

1204: The terminal apparatus receives, based on the update period and the time-frequency resource, the uplink time-frequency synchronization parameter sent by the network apparatus.

In this embodiment, the terminal apparatus receives, based on the update period and the time-frequency resource, the updated uplink time-frequency synchronization parameter. This step is similar to step 604. Details are not described herein again.

In this embodiment of this application, the network apparatus sends the second message, where the second message includes the time-frequency resource indication information and the update period, so that the terminal apparatus can update the uplink time-frequency synchronization parameter in time. This reduces an error of uplink time-frequency synchronization, and ensures communication quality. In this solution, the terminal apparatus does not need to calculate the update period, so that calculation complexity of the terminal apparatus is reduced, and power consumption of the terminal apparatus is reduced.

Based on the foregoing embodiment, when a time length for the terminal apparatus to send an uplink signal is greater than first time, the terminal apparatus receives, at an interval of second time, the uplink time-frequency synchronization parameter sent by the network apparatus. Optionally, the terminal apparatus receives, in third time, the uplink time-frequency synchronization parameter sent by the network apparatus. The second time is less than the first time.

For example, when the time length for the terminal apparatus to send the uplink signal is greater than 2 seconds, the terminal apparatus receives, at an interval of 1 second, the uplink time-frequency synchronization parameter sent by the network apparatus. The terminal apparatus receives, within 200 milliseconds, the uplink time-frequency synchronization parameter sent by the network apparatus.

The foregoing mainly describes the solutions provided in embodiments of this application from the perspective of the methods. It may be understood that, to implement the foregoing functions, the terminal apparatus and/or the network apparatus include/includes hardware structures and/or software modules for performing corresponding functions. A person of ordinary skill in the art should easily be aware that, in combination with the examples described in embodiments disclosed in this specification, modules, algorithms and steps may be implemented by hardware or a combination of hardware and computer software. Whether a function is executed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, the terminal apparatus and/or the network apparatus may be divided into functional modules based on the foregoing method examples. For example, each functional module may be obtained through division based on each corresponding function, or two or more functions may be integrated into one transceiver module or processing module. The integrated module may be implemented in a form of hardware, or may be implemented in a form of a software functional module. It should be noted that, in embodiments of this application, module division is an example, and is merely logical function division. In actual implementation, another division manner may be used.

Figure 13:
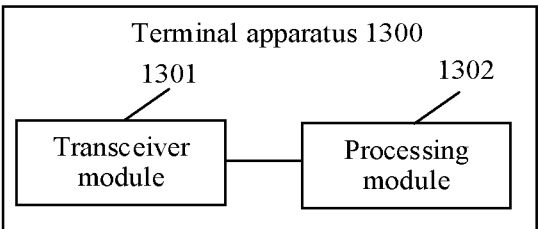
FIG. 13 is a schematic diagram of an embodiment of a terminal apparatus according to an embodiment of this application.

The following describes in detail the terminal apparatus in this application. FIG. 13 is a schematic diagram of an embodiment of the terminal apparatus according to an embodiment of this application. A terminal apparatus 1300 includes: a transceiver module 1301, configured to receive a parameter that is configured by a network apparatus and that is used to calculate an update period, where the update period is used to indicate time at which the terminal apparatus 1300 receives an uplink time-frequency synchronization parameter.

The transceiver module 1301 is further configured to receive an updated uplink time-frequency synchronization parameter based on the update period.

In some optional embodiments of this application, the transceiver module 1301 is further configured to receive time-frequency resource indication information sent by the network apparatus, where the time-frequency resource indication information indicates one or more time-frequency resources.

The transceiver module 1301 is further configured to receive the updated uplink time-frequency synchronization parameter based on the time-frequency resource, where the time-frequency resource is used to transmit the uplink time-frequency synchronization parameter, and the time-frequency resource includes a subframe, a slot, a symbol, and/or a frequency domain resource.

In some optional embodiments of this application, the transceiver module 1301 is configured to receive a parameter of an update period equation, update start time, and a time interval for calculating the update period that are configured by the network apparatus.

A processing module 1302 is configured to obtain the update period through calculation based on the update period equation, the parameter of the update period equation, the update start time, and the time interval for calculating the update period.

In some optional embodiments of this application, the update period equation is:

$$y=a \times t^2+b \times t+c, \text{ where } t=T+n \times \Delta T.$$

a, b, and c are parameters of the update period equation, T is the update start time, $\Delta T$ is the time interval for calculating the update period, n is a quantity of times of calculating the update period, and y is the update period.

In some optional embodiments of this application, the transceiver module 1301 is configured to receive a start value of the update period, an end value of the update period, a time interval for calculating the update period, and an update period interval that are configured by the network apparatus.

A processing module 1302 is configured to calculate the update period based on the start value of the update period and the update period interval, where the update period is calculated once at an interval of the time interval for calculating the update period.

The processing module 1302 is configured to: when the update period interval is greater than 0, and the update period is greater than or equal to the end value of the update period, stop calculation; or when the update period interval is less than 0, and the update period is less than or equal to the end value of the update period, stop calculation.

In some optional embodiments of this application, the transceiver module 1301 is configured to receive an initial value of the update period, an update period interval, and an update moment set that are configured by the network apparatus, where the update moment set includes one or more moments, and the update moment set is used to indicate time at which the terminal apparatus 1300 calculates the update period.

A processing module 1302 is configured to calculate, based on the start value of the update period and the update period interval, the update period at the time indicated by the update moment set.

In some optional embodiments of this application, the transceiver module 1301 is configured to receive an end value of the update period, a time interval for calculating the update period, and an update period interval that are configured by the network apparatus.

A processing module 1302 is configured to determine a start value of the update period based on the update period used by the terminal apparatus 1300.

The processing module 1302 is configured to calculate the update period based on the start value of the update period and the update period interval, where the update period is calculated once at an interval of the time interval for calculating the update period.

The processing module 1302 is configured to: when the update period interval is greater than 0, and the update period is greater than or equal to the end value of the update period, stop calculation; or when the update period interval is less than 0, and the update period is less than or equal to the end value of the update period, stop calculation.

In some optional embodiments of this application, the transceiver module 1301 is configured to receive a first message sent by the network apparatus, where the first message carries the parameter.

The first message is an SIB, OSI, an MIB, RRC, DCI, a MAC CE, a TAC, a BWP-DownlinkCommon, a BWP-UplinkCommon, a BWP-DownlinkDedicated, a BWP-UplinkDedicated, a BWP, a TCI, or an SSB.

In some optional embodiments of this application, the uplink time-frequency synchronization parameter includes one or more pieces of the following information: PVT information of a satellite, common TA, a common TA rate, a Doppler shift, or a Doppler shift rate.

It should be noted that content such as information exchange and an execution process between the modules/components in the terminal apparatus 1300 is based on a same concept as the method embodiments corresponding to FIG. 1A to FIG. 12 in this application. For specific content, refer to the descriptions in the foregoing method embodiments in this application. Details are not described herein again.

Figure 14:
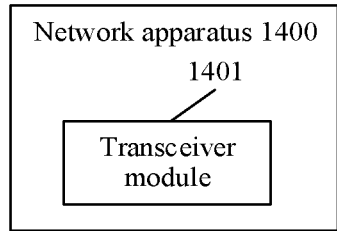
FIG. 14 is a schematic diagram of an embodiment of a network apparatus according to an embodiment of this application.

The following describes in detail the network apparatus in this application. FIG. 14 is a schematic diagram of an embodiment of the network apparatus according to an embodiment of this application. A network apparatus 1400 includes: a transceiver module 1401, configured to send, to a terminal apparatus, a parameter for calculating an update period, where the update period is used to indicate time at which the terminal apparatus receives an uplink time-frequency synchronization parameter.

The transceiver module 1401 is further configured to send an updated uplink time-frequency synchronization parameter to the terminal apparatus.

In some optional embodiments of this application, the transceiver module 1401 is further configured to configure a time-frequency resource set for the terminal apparatus, where a time-frequency resource in the time-frequency resource set is used to transmit the uplink time-frequency synchronization parameter, and the time-frequency resource includes a subframe, a slot, a symbol, and/or a frequency domain resource.

In some optional embodiments of this application, the parameter includes: a parameter of an update period equation, update start time, and a time interval for calculating the update period.

In some optional embodiments of this application, the parameter includes: a start value of the update period, an end value of the update period, a time interval for calculating the update period, and an update period interval.

In some optional embodiments of this application, the parameter includes: an initial value of the update period, an update period interval, and an update moment set. The update moment set includes one or more moments, and the update moment set is used to indicate time at which the terminal apparatus calculates the update period.

In some optional embodiments of this application, the parameter includes: an end value of the update period, a time interval for calculating the update period, and an update period interval.

In some optional embodiments of this application, the transceiver module 1401 is further configured to send a first message to the terminal apparatus, where the first message carries the parameter.

The first message is an SIB, OSI, an MIB, RRC, DCI, a MAC CE, a TAC, a BWP-DownlinkCommon, a BWP-UplinkCommon, a BWP-DownlinkDedicated, a BWP-Up-linkDedicated, a BWP, a TCI, or an SSB.

It should be noted that content such as information exchange and an execution process between the modules/components in the network apparatus 1400 is based on a same concept as the method embodiments corresponding to FIG. 1A to FIG. 12 in this application. For specific content, refer to the descriptions in the foregoing method embodiments in this application. Details are not described herein again.

Figure 15:
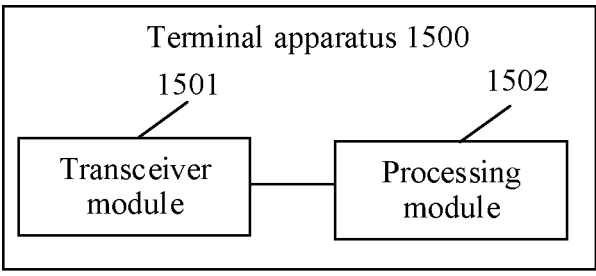
FIG. 15 is a schematic diagram of an embodiment of a terminal apparatus according to an embodiment of this application.

FIG. 15 is a schematic diagram of an embodiment of a terminal apparatus according to an embodiment of this application. A terminal apparatus 1500 includes: a transceiver module 1501, configured to receive a second message sent by a network apparatus, where the second message includes time-frequency resource indication information and an update period, the time-frequency resource indication information indicates one or more time-frequency resources, the update period is used to indicate time at which the terminal apparatus 1500 receives an uplink time-frequency synchronization parameter, and the time-frequency resource is used to transmit the uplink time-frequency synchronization parameter.

The transceiver module 1501 is further configured to receive, based on the update period and the time-frequency resource, the uplink time-frequency synchronization parameter sent by the network apparatus.

In some optional embodiments of this application, the transceiver module 1501 is further configured to receive an index number sent by the network apparatus, where the index number is associated with one of the update periods and one of the time-frequency resources.

A processing module 1502 is further configured to determine the update period and the time-frequency resource based on the second message and the index number.

It should be noted that content such as information exchange and an execution process between the modules/components in the terminal apparatus 1500 is based on a same concept as the method embodiments corresponding to FIG. 1A to FIG. 12 in this application. For specific content, refer to the descriptions in the foregoing method embodiments in this application. Details are not described herein again.

Figure 16:
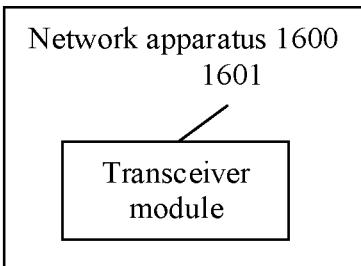
FIG. 16 is a schematic diagram of an embodiment of a terminal apparatus according to an embodiment of this application.

FIG. 16 is a schematic diagram of an embodiment of a network apparatus according to an embodiment of this application. A network apparatus 1600 includes: a transceiver module 1601, configured to send a second message to a terminal apparatus, where the second message includes time-frequency resource indication information and an update period, the time-frequency resource indication information indicates one or more time-frequency resources, the update period is used to indicate time at which the terminal apparatus receives an uplink time-frequency synchronization parameter, and the time-frequency resource is used to transmit the uplink time-frequency synchronization parameter.

The transceiver module 1601 is further configured to send an updated uplink time-frequency synchronization parameter to the terminal apparatus.

In some optional embodiments of this application, the transceiver module 1601 is further configured to send an index number to the terminal apparatus, where the index number is associated with one of the update periods and one of the time-frequency resources.

It should be noted that content such as information exchange and an execution process between the modules/components in the network apparatus 1600 is based on a same concept as the method embodiments corresponding to FIG. 1A to FIG. 12 in this application. For specific content, refer to the descriptions in the foregoing method embodiments in this application. Details are not described herein again.

It should be noted that, for specific implementations and beneficial effects of the terminal apparatus 1300, the network apparatus 1400, the terminal apparatus 1500, the network apparatus 1600, or a computing device, refer to the descriptions in the method embodiments corresponding to FIG. 1A to FIG. 12. Details are not described herein again.

The terminal apparatus in the foregoing embodiments may be an independent terminal apparatus, or may be a chip used in the terminal apparatus, or another combined part, component, or the like that can implement a function of the foregoing terminal apparatus. When the terminal apparatus is an independent terminal apparatus, the transceiver module (including a receiving module and a sending module) may be a transceiver. The transceiver may include an antenna, a radio frequency circuit, and the like. The processing module may be a processor, for example, a baseband chip. When the terminal apparatus is a component having a function of the terminal apparatus, the receiving module and the sending module may be a radio frequency unit, and the processing module may be a processor. When the terminal apparatus is a chip system, the receiving module may be an input port of the chip system, the sending module may be an output interface of the chip system, and the processing module may be a processor of the chip system, for example, a CPU.

In this embodiment of this application, a memory included in the terminal apparatus is mainly configured to store a software program and data, for example, store the update period and the parameter for calculating the update period that are described in the foregoing embodiments. The terminal apparatus further has the following functions.

The terminal apparatus includes: a transceiver, configured to receive a parameter that is configured by a network apparatus and that is used to calculate an update period, where the update period is used to indicate time at which the terminal apparatus receives an uplink time-frequency synchronization parameter.

The transceiver is further configured to receive an updated uplink time-frequency synchronization parameter based on the update period.

In some optional embodiments of this application, the transceiver is further configured to receive time-frequency resource indication information sent by the network apparatus, where the time-frequency resource indication information indicates one or more time-frequency resources.

The transceiver is further configured to receive the updated uplink time-frequency synchronization parameter based on the time-frequency resource, where the time-frequency resource is used to transmit the uplink time-frequency synchronization parameter, and the time-frequency resource includes a subframe, a slot, a symbol, and/or a frequency domain resource.

In some optional embodiments of this application, the transceiver is configured to receive a parameter of an update period equation, update start time, and a time interval for calculating the update period that are configured by the network apparatus.

A processor is configured to obtain the update period through calculation based on the update period equation, the parameter of the update period equation, the update start time, and the time interval for calculating the update period.

In some optional embodiments of this application, the update period equation is:

$$y=a \times t^2 + b \times t + c, \text{ where } t=T+n \times \Delta T.$$

a, b, and c are parameters of the update period equation, T is the update start time, $\Delta T$ is the time interval for calculating the update period, n is a quantity of times of calculating the update period, and y is the update period.

In some optional embodiments of this application, the transceiver is configured to receive a start value of the update period, an end value of the update period, a time interval for calculating the update period, and an update period interval that are configured by the network apparatus.

A processor is configured to calculate the update period based on the start value of the update period and the update period interval, where the update period is calculated once at an interval of the time interval for calculating the update period.

The processor is configured to: when the update period interval is greater than 0, and the update period is greater than or equal to the end value of the update period, stop calculation; or when the update period interval is less than 0, and the update period is less than or equal to the end value of the update period, stop calculation.

In some optional embodiments of this application, the transceiver is configured to receive an initial value of the update period, an update period interval, and an update moment set that are configured by the network apparatus, where the update moment set includes one or more moments, and the update moment set is used to indicate time at which the terminal apparatus calculates the update period.

A processor is configured to calculate, based on the start value of the update period and the update period interval, the update period at the time indicated by the update moment set.

In some optional embodiments of this application, the transceiver is configured to receive an end value of the update period, a time interval for calculating the update period, and an update period interval that are configured by the network apparatus.

A processor is configured to determine a start value of the update period based on the update period used by the terminal apparatus.

The processor is configured to calculate the update period based on the start value of the update period and the update period interval, where the update period is calculated once at an interval of the time interval for calculating the update period.

The processor is configured to: when the update period interval is greater than 0, and the update period is greater than or equal to the end value of the update period, stop calculation; or when the update period interval is less than 0, and the update period is less than or equal to the end value of the update period, stop calculation.

In some optional embodiments of this application, the transceiver is configured to receive a first message sent by the network apparatus, where the first message carries the parameter.

The first message is an SIB, OSI, an MIB, RRC, DCI, a MAC CE, a TAC, a BWP-DownlinkCommon, a BWP-UplinkCommon, a BWP-DownlinkDedicated, a BWP-Up-linkDedicated, a BWP, a TCI, or an SSB.

In some optional embodiments of this application, the uplink time-frequency synchronization parameter includes one or more pieces of the following information: PVT information of a satellite, common TA, a common TA rate, a Doppler shift, or a Doppler shift rate.

The terminal apparatus includes: a transceiver, configured to receive a second message sent by a network apparatus, where the second message includes time-frequency resource indication information and an update period, the time-frequency resource indication information indicates one or more time-frequency resources, the update period is used to indicate time at which the terminal apparatus receives an uplink time-frequency synchronization parameter, and the time-frequency resource is used to transmit the uplink time-frequency synchronization parameter.

The transceiver is further configured to receive, based on the update period and the time-frequency resource, the uplink time-frequency synchronization parameter sent by the network apparatus.

In some optional embodiments of this application, the transceiver is further configured to receive an index number sent by the network apparatus, where the index number is associated with one of the update periods and one of the time-frequency resources.

A processor is further configured to determine the update period and the time-frequency resource based on the second message and the index number.

The network apparatus in the foregoing embodiments may be an independent network apparatus, or may be a chip used in the network apparatus, or another combined part, component, or the like that can implement a function of the foregoing network apparatus. When the network apparatus is an independent network apparatus, the transceiver module (including a receiving module and a sending module) may be a transceiver. The transceiver may include an antenna, a radio frequency circuit, and the like. The processing module may be a processor, for example, a baseband chip. When the network apparatus is a component having a function of the network apparatus, the receiving module and the sending module may be a radio frequency unit, and the processing module may be a processor. When the network apparatus is a chip system, the receiving module may be an input port of the chip system, the sending module may be an output interface of the chip system, and the processing module may be a processor of the chip system, for example, a CPU.

In this embodiment of this application, a memory included in the network apparatus is mainly configured to store a software program and data, for example, store the update period and the parameter for calculating the update period that are described in the foregoing embodiments. The network apparatus further has the following functions.

A transceiver is configured to send, to a terminal apparatus, a parameter for calculating an update period, where the update period is used to indicate time at which the terminal apparatus receives an uplink time-frequency synchronization parameter.

The transceiver is further configured to send an updated uplink time-frequency synchronization parameter to the terminal apparatus.

In some optional embodiments of this application, the transceiver is further configured to configure a time-frequency resource set for the terminal apparatus, where a time-frequency resource in the time-frequency resource set is used to transmit the uplink time-frequency synchronization parameter, and the time-frequency resource includes a subframe, a slot, a symbol, and/or a frequency domain resource.

In some optional embodiments of this application, the parameter includes: a parameter of an update period equation, update start time, and a time interval for calculating the update period.

In some optional embodiments of this application, the parameter includes: a start value of the update period, an end value of the update period, a time interval for calculating the update period, and an update period interval.

In some optional embodiments of this application, the parameter includes: an initial value of the update period, an update period interval, and an update moment set, where the update moment set includes one or more moments, and the update moment set is used to indicate time at which the terminal apparatus calculates the update period.

In some optional embodiments of this application, the parameter includes: an end value of the update period, a time interval for calculating the update period, and an update period interval.

In some optional embodiments of this application, the transceiver is further configured to send a first message to the terminal apparatus, where the first message carries the parameter.

The first message is an SIB, OSI, an MIB, RRC, DCI, a MAC CE, a TAC, a BWP-DownlinkCommon, a BWP-UplinkCommon, a BWP-DownlinkDedicated, a BWP-UplinkDedicated, a BWP, a TCI, or an SSB.

The network apparatus includes: a transceiver, configured to send a second message to a terminal apparatus, where the second message includes time-frequency resource indication information and an update period, the time-frequency resource indication information indicates one or more time-frequency resources, the update period is used to indicate time at which the terminal apparatus receives an uplink time-frequency synchronization parameter, and the time-frequency resource is used to transmit the uplink time-frequency synchronization parameter.

The transceiver is further configured to send an updated uplink time-frequency synchronization parameter to the terminal apparatus.

In some optional embodiments of this application, the transceiver is further configured to send an index number to the terminal apparatus, where the index number is associated with one of the update periods and one of the time-frequency resources.

An embodiment of this application further provides a processing apparatus. The processing apparatus includes a processor and an interface. The processor is configured to perform the parameter update method according to any one of the method embodiments.

It should be understood that the processing apparatus may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

Herein, "implemented by using hardware" means that a function of the foregoing module or unit is implemented through a hardware processing circuit that does not have a function of processing program instructions. The hardware processing circuit may include a discrete hardware component, or may be an integrated circuit. To reduce power consumption and a size, an integrated circuit is usually used for implementation. The hardware processing circuit may include an ASIC or a programmable logic device (PLD). The PLD may further include an FPGA, a complex programmable logic device (CPLD), and the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit that is configured to implement an FPGA function and a CPU may be formed on a silicon base, and are independently packaged into a chip, where the chip is also referred to as a system on a programmable chip (SoPC).

An embodiment of this application further provides a computer-readable storage medium, including instructions. When the instructions are run on a computer, the computer is enabled to control a computing device to perform any implementation shown in the foregoing method embodiments.

An embodiment of this application further provides a computer program product. The computer program product includes computer program code. When the computer program code is run on a computer, the computer is enabled to perform any implementation shown in the foregoing method embodiments.

An embodiment of this application further provides a chip system, including a memory and a processor. The memory is configured to store a computer program, and the processor is configured to invoke the computer program from the memory and run the computer program, so that a chip is enabled to perform any implementation shown in the foregoing method embodiments.

An embodiment of this application further provides a chip system, including a processor. The processor is configured to invoke and run a computer program, so that a chip is enabled to perform any implementation shown in the foregoing method embodiments.

In addition, it should be noted that the described apparatus embodiments are merely examples. The units described as separate parts may or may not be physically separate, and parts displayed as units may or may not be physical units, that is, may be located in one position, or may be distributed on a plurality of network units. Some or all the modules may be selected based on an actual requirement to achieve the objectives of the solutions of embodiments. In addition, in the accompanying drawings of the apparatus embodiments provided by this application, connection relationships between modules indicate that the modules have communication connections with each other, which may be implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to implement a same function may be in various forms, for example, in a form of an analog circuit, a digital circuit, or a dedicated circuit. However, as for this application, software program implementation is a better implementation in most cases. Based on such an understanding, the technical solutions of this application essentially or a part contributing to the technology may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used to implement the embodiments, all or some of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, terminal apparatus, network apparatus, computing device, or data center to another website, computer, terminal apparatus, network apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a terminal apparatus, a network apparatus, or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes need to be determined according to functions and internal logic of the processes, and should not be construed as any limitation on the implementation processes of embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

It should be understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to the technology, or all or some of the technical solutions may be implemented in a form of a software product. The computer software product is stored in a storage medium and includes several instructions for instructing a computer device (which may be a personal computer, a server, a network apparatus, or the like) to perform all or some of the steps of the methods in embodiments of this application.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A parameter update method implemented by a terminal apparatus, wherein the parameter update method comprises:
    receiving a parameter that is from a network apparatus and that is configured for calculating an update period, wherein the update period indicates a first time at which the terminal apparatus is to receive an uplink time-frequency synchronization parameter;
    receiving an update period equation, an update start time, and a time interval for calculating the update period that are from the network apparatus; and
    obtaining, based on the update period equation, the parameter of the update period equation, the update start time, and the time interval, the update period, wherein the update period equation is:

$$y = a \times t^2 + b \times t + c,$$

wherein $t = T + n \times \Delta T$, wherein a, b, and c are parameters of the update period equation, wherein T is the update start time, wherein $\Delta T$ is the time interval, wherein n is a quantity of times of calculating the update period, and wherein y is the update period; and
    receiving, during the update period, an updated uplink time-frequency synchronization parameter.

2. The parameter update method of claim 1, further comprising:
    receiving, from the network apparatus, time-frequency resource indication information, wherein the time-frequency resource indication information indicates one or more time-frequency resources; and
    further receiving, based on the time-frequency resource, the updated uplink time-frequency synchronization parameter, wherein the time-frequency resource is for transmitting the uplink time-frequency synchronization parameter, and
    wherein the time-frequency resource comprises a subframe, a slot, a symbol, or a frequency domain resource.

3. The parameter update method of claim 1, wherein receiving the parameter comprises receiving, from the network apparatus, a first message that carries the parameter, wherein the first message is a system information block (SIB), other system information (OSI), a master system information block (MIB), Radio Resource Control (RRC) message, downlink control information (DCI), a media access control (MAC) control element (CE), a timing advance command (TAC), a bandwidth part-downlink common parameter (BWP-DownlinkCommon), a bandwidth part-uplink common parameter (BWP-UplinkCommon), a bandwidth part-downlink dedicated parameter (BWP-DownlinkDedicated), a bandwidth part-uplink dedicated parameter (BWP-UplinkDedicated), a bandwidth part (BWP), a transmission configuration indicator (TCI), or a synchronization signal block (SSB).

4. The parameter update method of claim 1, wherein the uplink time-frequency synchronization parameter comprises one or more of position velocity time (PVT) information of a satellite, common timing advance (TA), a common TA rate, a Doppler shift, or a Doppler shift rate.

5. A parameter update method implemented by a terminal apparatus, wherein the parameter update method comprises:
    receiving, from a network apparatus, a message, wherein the message comprises time-frequency resource indication information and an update period, wherein the time-frequency resource indication information indicates a time-frequency resource, wherein the update period indicates a time at which the terminal apparatus is to receive an uplink time-frequency synchronization parameter, and wherein the time-frequency resource is for transmitting the uplink time-frequency synchronization parameter;
    receiving, from the network apparatus, a start value of the update period, an end value of the update period, a time interval for calculating the update period, and an update period interval;
    calculating, based on the start value and the update period interval, the update period, wherein the update period is calculated once at an interval of the time interval;
    stopping the calculation when the update period interval is greater than 0 and the update period is greater than or equal to the end value; and
    stopping the calculation when the update period interval is less than 0 and the update period is less than or equal to the end value; and
    receiving, based on the update period and the time-frequency resource, the uplink time-frequency synchronization parameter.

6. The parameter update method of claim 5, further comprising:
    receiving, from the network apparatus, an index number, wherein the index number is associated with the update period or the time-frequency resource; and
    determining, based on the message and the index number, the update period and the time-frequency resource.

7. The parameter update method of claim 5, wherein the start value is based on the update period.

8. The parameter update method of claim 5, wherein the uplink time-frequency synchronization parameter comprises position velocity time (PVT) information of a satellite.

9. The parameter update method of claim 5, wherein the uplink time-frequency synchronization parameter comprises common timing advance (TA).

10. The parameter update method of claim 5, wherein the uplink time-frequency synchronization parameter comprises a common timing advance (TA) rate.

11. The parameter update method of claim 5, wherein the uplink time-frequency synchronization parameter comprises a Doppler shift.

12. The parameter update method of claim 5, wherein the uplink time-frequency synchronization parameter comprises a Doppler shift rate.

13. A terminal apparatus, comprising:

a memory configured to store instructions; and a processor coupled to the memory and configured to execute the instructions to:

receive a parameter that is from a network apparatus and that is configured for calculating an update period, wherein the update period indicates a first time at which the terminal apparatus receives an uplink time-frequency synchronization parameter;

receive an initial value of the update period, an update period interval, and an update moment set that are from the network apparatus, wherein the update moment set comprises one or more moments, and wherein the update moment set indicates a second time at which the terminal apparatus calculates the update period;

calculate, based on a start value of the update period and the update period interval, the update period at the second time; and receive, during the update period, an updated uplink time-frequency synchronization parameter.

14. The terminal apparatus of claim 13, wherein the processor is further configured to execute the instructions to:

receive, from the network apparatus, time-frequency resource indication information, wherein the time-frequency resource indication information indicates one or more time-frequency resources; and receive, based on the time-frequency resource, the updated uplink time-frequency synchronization parameter, wherein the time-frequency resource is used to transmit the uplink time-frequency synchronization parameter, and wherein the time-frequency resource comprises a subframe, a slot, a symbol, or a frequency domain resource.

15. The terminal apparatus of claim 13, perform communication based on the updated uplink time-frequency synchronization parameter.

16. The terminal apparatus of claim 13, wherein the uplink time-frequency synchronization parameter comprises position velocity time (PVT) information of a satellite.

17. The terminal apparatus of claim 13, wherein the uplink time-frequency synchronization parameter comprises common timing advance (TA).

18. The terminal apparatus of claim 13, wherein the uplink time-frequency synchronization parameter comprises a common timing advance (TA) rate.

19. The terminal apparatus of claim 13, wherein the uplink time-frequency synchronization parameter comprises a Doppler shift.

20. The terminal apparatus of claim 13, wherein the uplink time-frequency synchronization parameter comprises a Doppler shift rate.

* * * * *